United States Patent
Haustein et al.

(10) Patent No.: US 7,639,448 B2
(45) Date of Patent: *Dec. 29, 2009

(54) DIFFERENTIAL TIMING BASED SERVO PATTERN FOR MAGNETIC-BASED STORAGE MEDIA

(75) Inventors: Nils Haustein, Jahnstrasse (DE); Craig A. Klein, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/676,107

(22) Filed: Feb. 16, 2007

(65) Prior Publication Data

US 2007/0146925 A1    Jun. 28, 2007

Related U.S. Application Data

(63) Continuation-in-part of application No. 11/283,374, filed on Nov. 18, 2005.

(51) Int. Cl.
*G11B 5/584* (2006.01)
*G11B 5/09* (2006.01)
*G11B 21/02* (2006.01)

(52) U.S. Cl. .................. 360/77.12; 360/48; 360/75
(58) Field of Classification Search .................. None
See application file for complete search history.

(56) References Cited

U.S. PATENT DOCUMENTS

| | | |
|---|---|---|
| 3,614,756 A | 10/1971 | McIntosh et al. |
| 4,652,945 A | 3/1987 | Marchant |
| 5,055,951 A | 10/1991 | Behr |
| 5,291,348 A | 3/1994 | Copolillo |
| 5,432,652 A | 7/1995 | Comeaux et al. |
| 5,689,384 A * | 11/1997 | Albrecht et al. .......... 360/77.12 |
| 6,021,013 A | 2/2000 | Albrecht et al. |
| 6,282,051 B1 | 8/2001 | Albrecht et al. |
| 6,320,719 B1 | 11/2001 | Albrecht et al. |
| 6,462,904 B1 | 10/2002 | Albrecht et al. |

(Continued)

FOREIGN PATENT DOCUMENTS

CN    1610937 A    4/2005

OTHER PUBLICATIONS

US Application entitled "Differential Timing Based Servo Pattern For Magnetic-Based Storage Media", U.S. Appl. No. 12/239,673, filed Sep. 26, 2008, by inventors D. Winarski, N. Haustein and C. A. Klein.

(Continued)

*Primary Examiner*—K. Wong
(74) *Attorney, Agent, or Firm*—David W. Victor; Konrad Raynes & Victor LLP

(57) ABSTRACT

A magnetic storage media includes a magnetic first-pole polarity initialized servo track segment and a magnetic second-pole polarity differential timing based servo pattern recorded on the magnetic first-pole polarity initialized servo track segment The magnetic second-pole polarity differential timing based servo pattern represents magnetic encoded servo position information for facilitating a determination of a servo position error signal exclusive of a plurality of fixed position error timing components and inclusive of a plurality of variable position error timing components.

29 Claims, 16 Drawing Sheets

U.S. PATENT DOCUMENTS

| | | | |
|---|---|---|---|
| 6,542,325 B1 * | 4/2003 | Molstad et al. | 360/77.12 |
| 6,580,581 B1 * | 6/2003 | Bui et al. | 360/78.02 |
| 6,710,967 B2 | 3/2004 | Hennecken et al. | |
| 6,754,026 B1 * | 6/2004 | Koski | 360/73.04 |
| 6,781,778 B1 | 8/2004 | Molstad et al. | |
| 6,873,482 B1 | 3/2005 | Hsieh et al. | |
| 6,873,487 B2 | 3/2005 | Molstad | |
| 6,879,457 B2 * | 4/2005 | Eaton et al. | 360/75 |
| 7,002,763 B2 * | 2/2006 | Bui et al. | 360/48 |
| 7,035,040 B2 * | 4/2006 | Molstad et al. | 360/77.12 |
| 7,106,544 B2 | 9/2006 | Dugas et al. | |
| 7,139,151 B2 * | 11/2006 | Johnson et al. | 360/77.12 |
| 7,170,702 B2 | 1/2007 | Ohtsu | |
| 7,259,930 B2 * | 8/2007 | Ohtsu | 360/73.04 |
| 7,289,289 B2 * | 10/2007 | Hoerger et al. | 360/75 |
| 7,411,759 B2 | 8/2008 | Trabert et al. | |
| 2007/0115578 A1 | 5/2007 | Winarski et al. | |

OTHER PUBLICATIONS

US Application entitled "Differential Timing Based Servo Pattern For Magnetic-Based Storage Media", U.S. Appl. No. 12/239,680, filed Sep. 26, 2008, by inventors D. Winarski, N. Haustein and C. A. Klein.

* cited by examiner

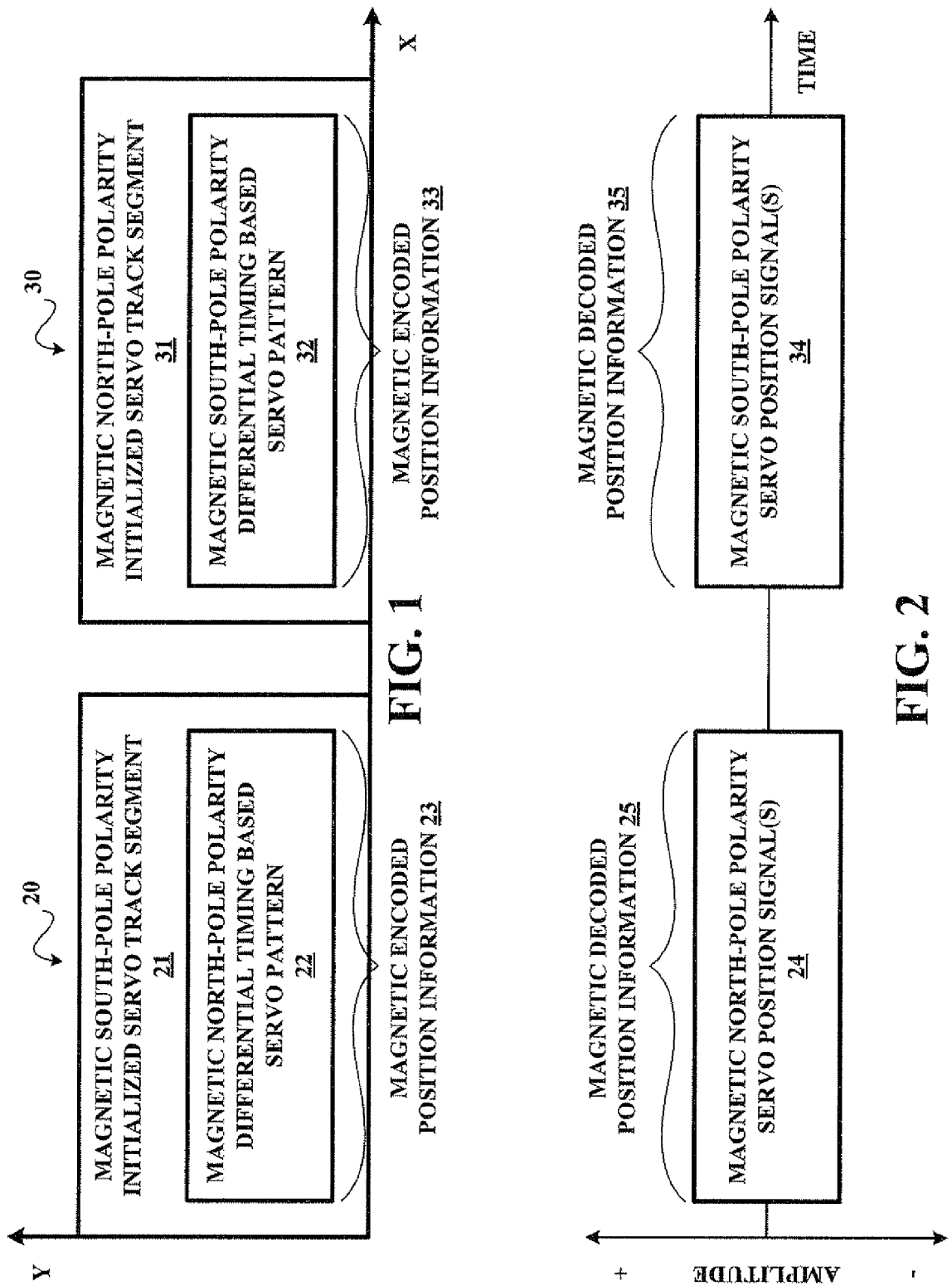

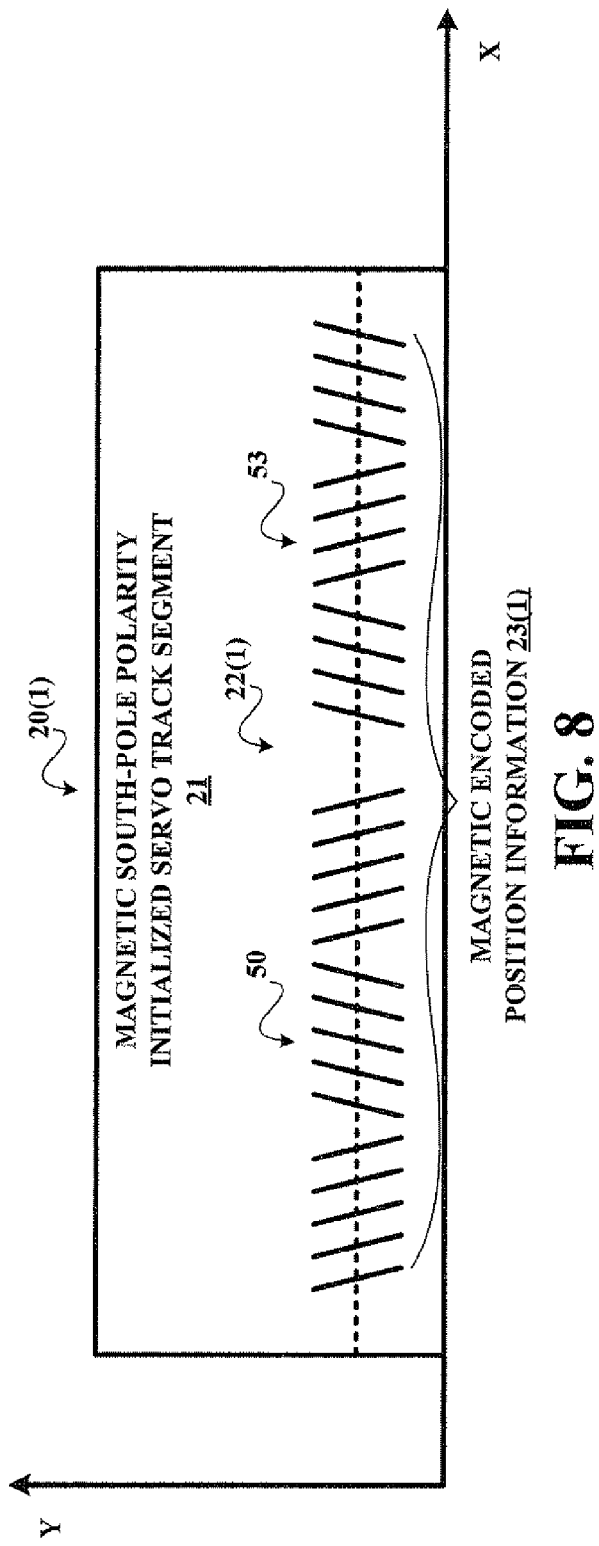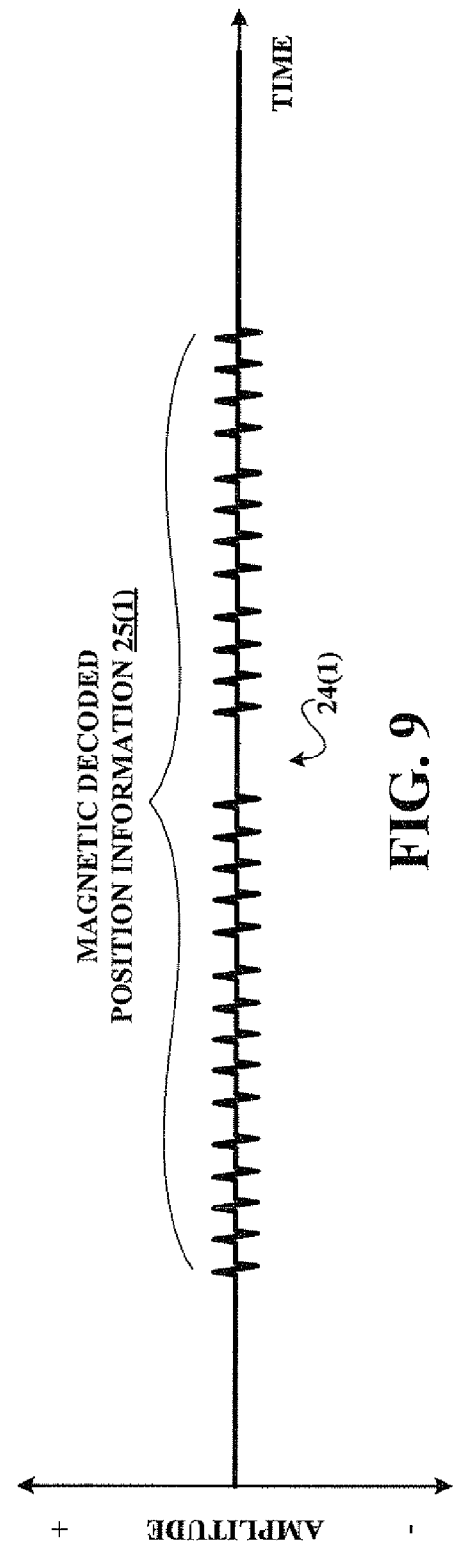

US 7,639,448 B2

DIFFERENTIAL TIMING BASED SERVO PATTERN FOR MAGNETIC-BASED STORAGE MEDIA

CROSS REFERENCE TO RELATED APPLICATIONS

This application is a continuation-in-part of application of U.S. patent application Ser. No. 11/283,374, filed Nov. 18, 2005.

FIELD OF THE INVENTION

The present invention generally relates to servo position information recorded on magnetic-based storage media (e.g., a magnetic tape, a magneto-optical tape and an optical phase-change tape). The present invention specifically relates to the servo position information encoded as a differential timing based servo pattern recorded on the magnetic-based storage media.

BACKGROUND OF THE INVENTION

The recording and reading of data in tracks on magnetic storage media requires precise positioning of magnetic read/write heads. Specifically, a magnetic write head must be quickly moved to and centered over a data track to facilitate a selective recording of data onto the data track. In operation, the magnetic write head records data onto the data track as relative movement occurs between the magnetic write head and the magnetic storage media in a transducing direction. Thereafter, the magnetic write head can be moved across the width of the magnetic storage media in a translating direction, which is perpendicular to the transducing direction, to a different data track to thereby selectively record data onto this data track.

Similarly, a magnetic read head must be quickly moved to and centered over a data track to facilitate reading of data recorded on the data track. In operation, the magnetic read head reads data recorded onto the data track as relative movement occurs between the magnetic read head and the magnetic storage media in the transducing direction. Thereafter, the magnetic read head can be moved across the width of the magnetic storage media in the translating direction, which again is perpendicular to the transducing direction, to a different data track to thereby selectively read data recorded onto this data track.

Storage drive devices that employ such magnetic heads for recording data on data tracks of a magnetic storage media and for reading data recorded on the data tracks on magnetic storage media typically use servo control systems to properly position the magnetic heads in the translating direction. A servo control system derives servo position information from a servo read head that reads servo position information recorded in one or more servo tracks that are advantageously recorded among the data tracks of the magnetic storage media. Based on the servo position information, the servo control system properly aligns the servo read head as needed relative to the servo track(s) being read whereby an associated magnetic head will concurrently be properly aligned with a data track for facilitating a recording of data onto that data track or a reading of recorded data from that data track.

A design of a servo pattern for encoding the servo position information is essential to the ability of the servo control system in deriving the servo position information. An example of one type of servo pattern for encoding servo position information is a magnetic timing based servo pattern that facilitates a decoding of servo position information indicating a translational position of the servo read head relative to the magnetic storage media. The magnetic time based servo pattern can further encode the servo position information whereby the decoded servo position information further indicates a transducing position of the servo read head relative to the magnetic storage media.

SUMMARY OF THE INVENTION

The present invention provides new and unique differential timing based servo pattern that further advances servo control technology.

A first form of the present invention is a magnetic storage media drive comprising a transducer, a servo decoder and a servo controller. The transducer includes a servo read head operable to generate a read head signal representative of a reading of at least one servo pattern recorded on a magnetic storage media including a magnetic first-pole polarity initialized servo track segment and a magnetic second-pole polarity differential timing based servo pattern recorded on the magnetic first-pole polarity initialized servo track segment, wherein the magnetic second-pole polarity differential timing based servo pattern represents magnetic encoded servo position information for facilitating a determination of a servo position error signal exclusive of a plurality of fixed position error timing components and inclusive of a plurality of variable position error timing components.

The servo decoder is in electrical communication with the transducer to receive the read head signal, and is operable to generate a decoded servo position signal as a function of determining the servo position error signal based on the read head signal, the decoded servo position signal being indicative of a position of the transducer relative to the magnetic storage media. The servo controller is in electrical communication with the servo decoder to receive the decoded servo position signal, and is operable to generate a servo control signal for selectively moving the transducer relative to the magnetic storage media.

A second form of the present invention is a servo system comprising a magnetic storage media cartridge, a transducer, a servo decoder and a servo controller. The magnetic storage media cartridge includes a cartridge housing adapted to interface with a cartridge drive, and a magnetic storage media contained within the cartridge housing. The magnetic storage media includes a magnetic first-pole polarity initialized servo track segment, and a magnetic second-pole polarity differential timing based servo pattern recorded on the magnetic first-pole polarity initialized servo track segment, wherein the magnetic second-pole polarity differential timing based servo pattern represents magnetic encoded servo position information for facilitating a determination of a servo position error signal exclusive of a plurality of fixed position error timing components and inclusive of a plurality of variable position error timing components.

The transducer includes a servo read head operable to generate a read head signal representative of a reading of the magnetic second-pole polarity differential timing based servo pattern recorded on the magnetic storage media. The servo decoder is in electrical communication with the transducer to receive the read head signal, and is operable to generate a decoded servo position signal as a function of determining the servo position error signal based on the read head signal, the decoded servo position signal being indicative of a position of the transducer relative to the magnetic storage media. The servo controller is in electrical communication with the servo decoder to receive the decoded servo position signal, and is operable to generate a servo control signal for selectively moving the transducer relative to the magnetic storage media.

The aforementioned forms and additional forms as wells as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

BRIEF DESCRIPTION OF TIE DRAWINGS

FIG. 1 illustrates one embodiment of a magnetic encoded servo position information in accordance with the present invention;

FIG. 2 illustrates exemplary magnetic decoded servo position information associated with the magnetic encoded servo position information illustrated in FIG. 1 in accordance with the present invention;

FIG. 8 illustrates a first exemplary embodiment of the magnetic encoded servo position information illustrated in FIG. 1 in accordance with the present invention;

FIG. 9 illustrates exemplary magnetic polarity decoded servo position information associated with the magnetic encoded servo position information illustrated in FIG. 8 in accordance with the present invention;

Figure 23:
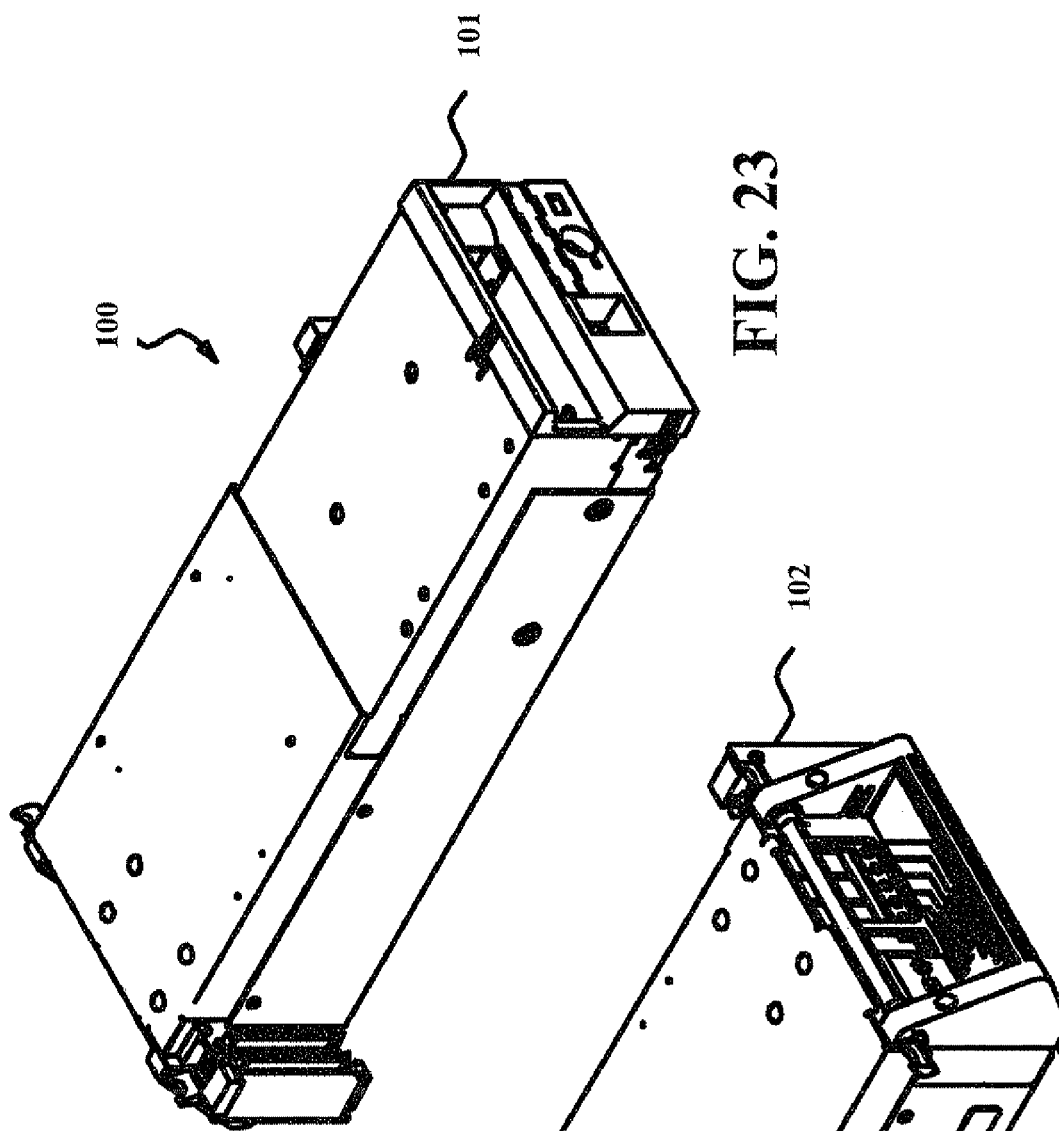
Figure 24:
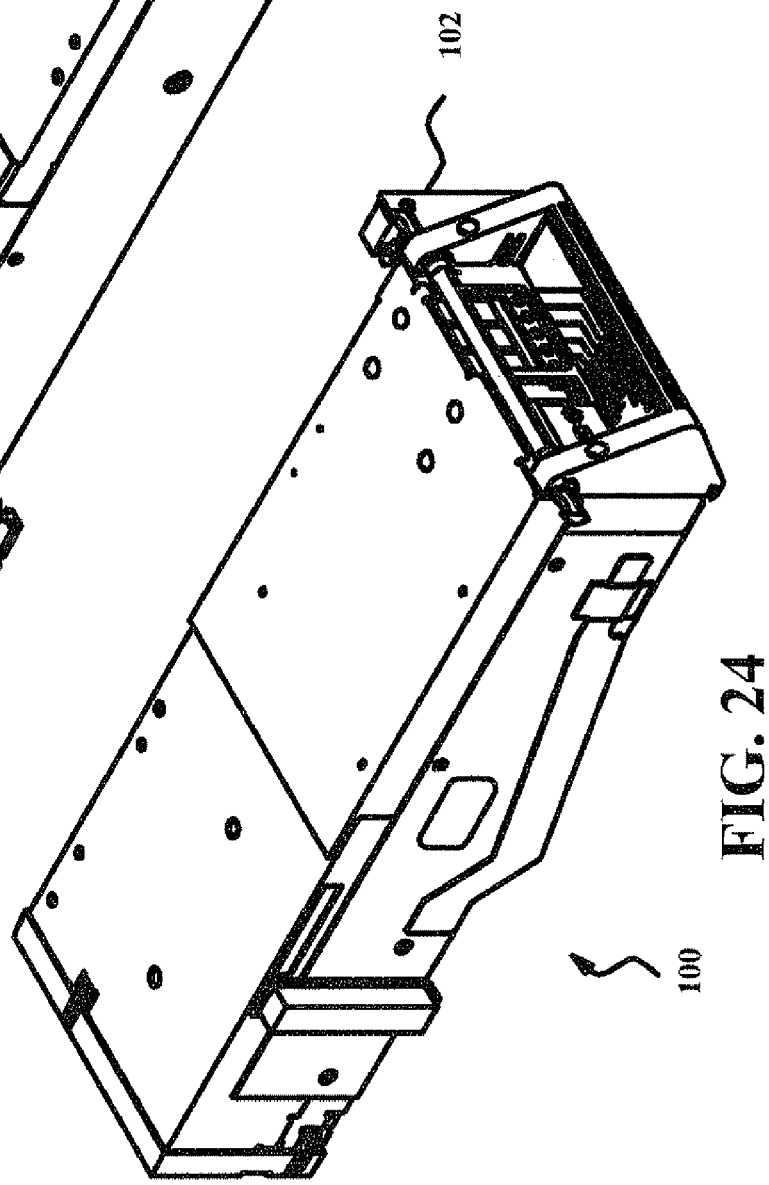
Figure 25:
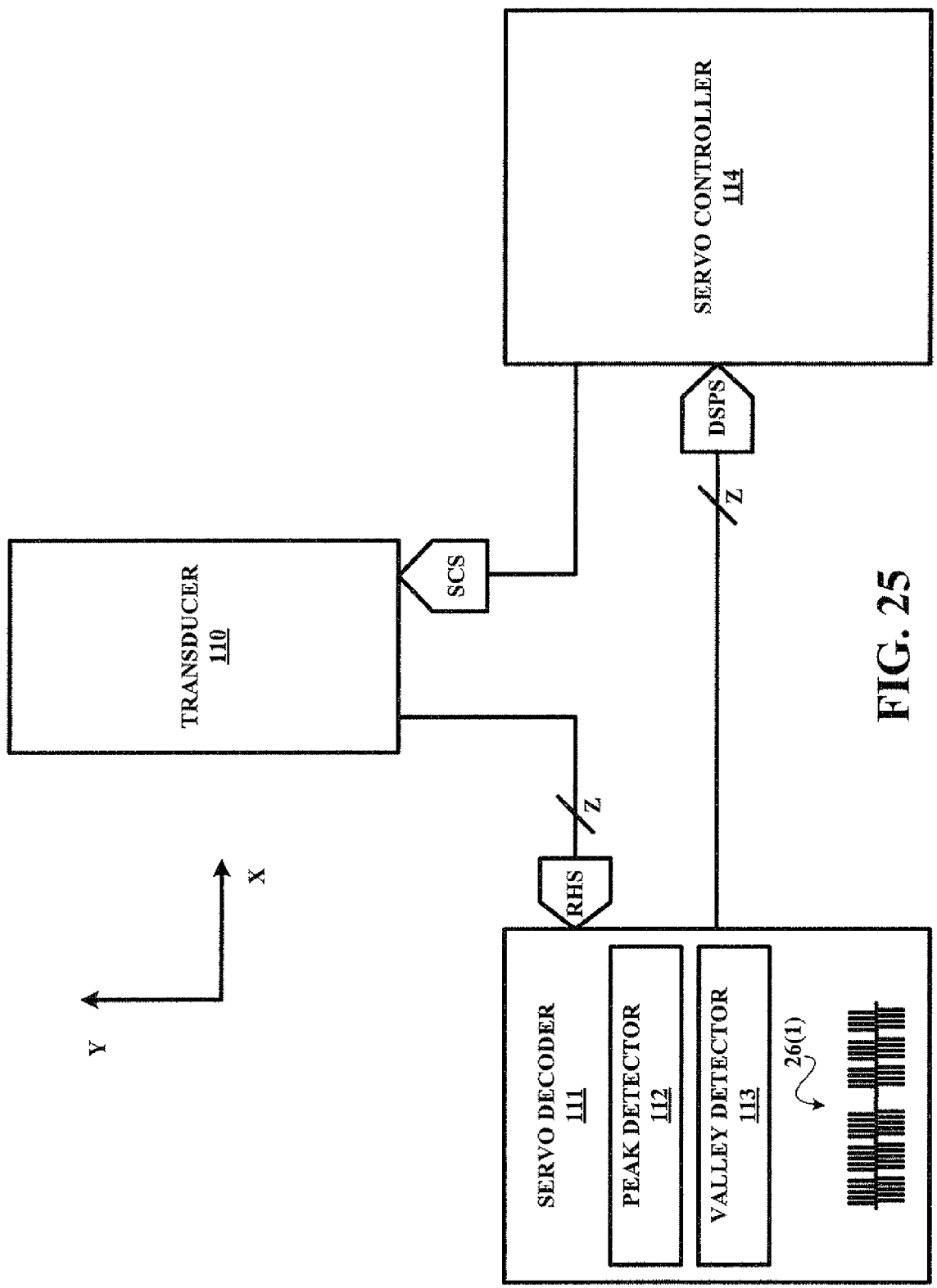

FIGS. 23 and 24 respectively illustrate a front view and rear view of one embodiment of a tape drive in accordance with the present invention; and FIG. 25 illustrates one embodiment of a servo control system in accordance with the present invention.

DETAILED DESCRIPTION OF THE PRESENT INVENTION

FIG. 1 illustrates a magnetic south-north servo band section 20 and a magnetic north-south servo band section 30 as recorded on a servo track of a magnetic storage media (not shown). Magnetic south-north servo band section 20 includes a magnetic south-pole polarity initialized servo track segment 21 and a magnetic north-pole polarity differential timing based servo pattern 22 recorded on magnetic south-pole polarity initialized servo track segment 21. Magnetic north-south servo band section 3 0 includes a magnetic north-pole polarity initialized servo track segment 31, and a magnetic south-pole polarity differential timing based servo pattern 32 recorded on magnetic north-pole polarity initialized servo track segment 31.

Magnetic north-pole polarity differential timing based servo pattern 22 represents magnetic encoded servo position information 23, and magnetic south-pole polarity differential timing based servo pattern 32 represents magnetic encoded servo position information 33. In one embodiment, magnetic south-north servo band section 20 and magnetic north-south servo band section 30 can be recorded on the same servo track of the magnetic storage media whereby sections 20 and 30 border each other or sections 20 and 30 are spaced from each other. In an alternative embodiment, magnetic south-north servo band section 20 and magnetic north-south servo band section 30 are recorded on different servo tracks of the magnetic storage media.

In operation, a servo read of magnetic south-north servo band section 20 generates one or more magnetic north-pole polarity servo position signals 24 as shown in FIG. 2 in dependence upon the format of magnetic north-pole polarity differential timing based servo pattern 22. Magnetic north-pole polarity servo position signals 24 represent magnetic decoded servo position information 25 for facilitating a determination of a translational position of a servo transducer (not shown) along a translation axis Y. Magnetic polarity decoded servo position information 25 may also facilitate a determination of a transducing position of the servo transducer along a transducing axis X in dependence upon the format of magnetic north-pole polarity differential timing based servo pattern 22.

Similarly, a servo read of magnetic north-south servo band section 30 generates one or more magnetic south-pole polarity servo position signals 34 as shown in FIG. 2 in dependence upon the format of magnetic south-pole polarity differential timing based servo pattern 32. Magnetic south-pole polarity servo position signals 34 represent magnetic decoded servo position information 35 for facilitating a determination of a translational position of a servo transducer (not shown) along translation axis Y. Magnetic polarity decoded servo position information 35 may also facilitate a determination of a transducing position of the servo transducer along transducing axis X in dependence upon the format of magnetic south-pole polarity differential timing based servo pattern 32.

The present invention is premised on differential timing based servo patterns 22 and 32 facilitating a determination of a servo position error signals that is exclusive of noise. The following is a description of a comparison of an exemplary standard timing based servo pattern as know in the art to exemplary differential timing based servo patterns of the present invention.

Figure 3:
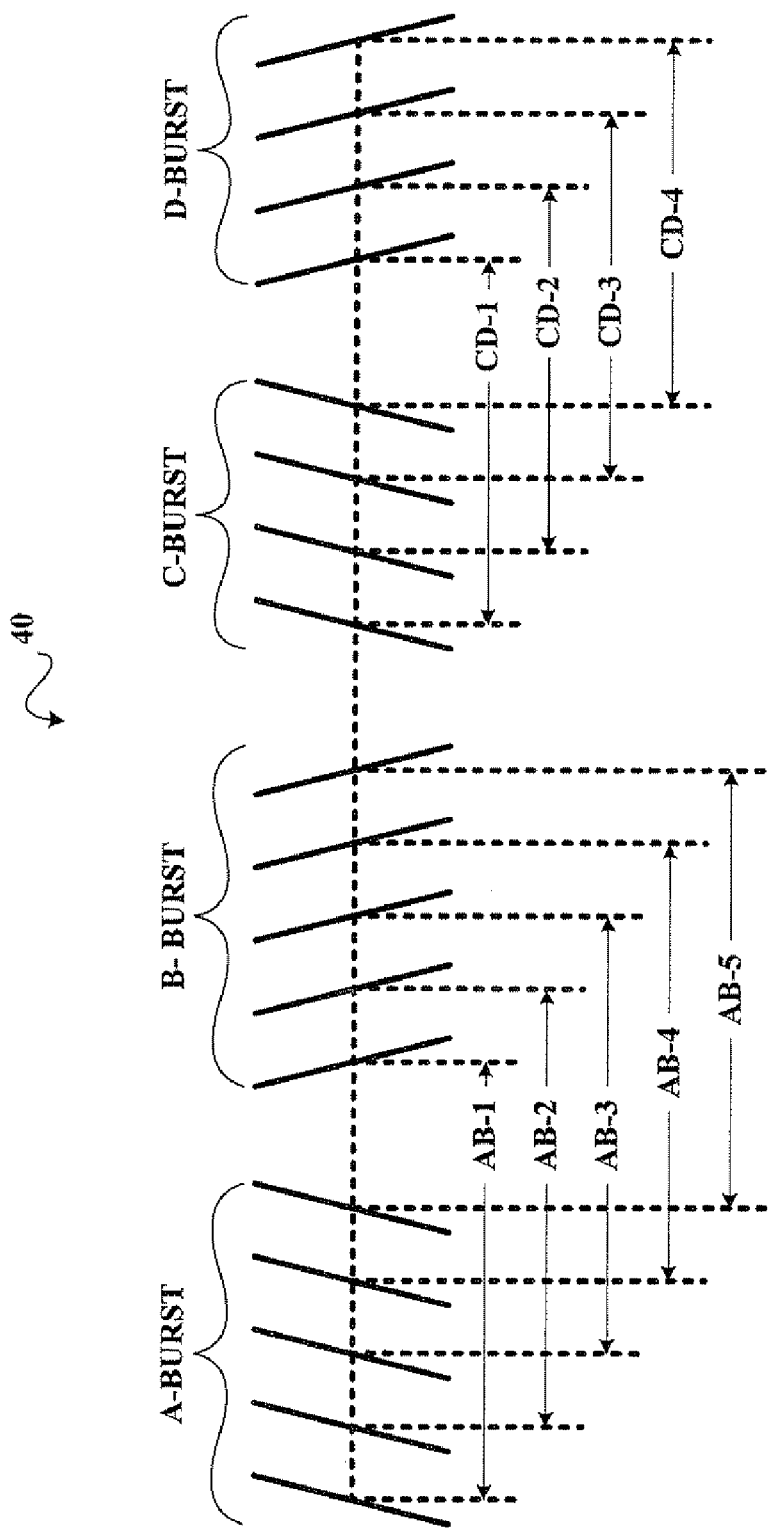
FIG. 3 illustrates an exemplary set of position error timings based on timing based servo pattern as known in the art.

FIG. 3 illustrates an exemplary timing based servo pattern 40 as known in the art. Timing based servo pattern 40 includes a standard A-burst of five (5) forward-slash stripes (//////), a standard B-burst of five (5) backward-slash stripes (\\\\\\), a standard C-burst of four (4) forward-slash stripes (/////) and a standard D-burst of four (4) magnetic backward-slash stripes (\\\\\). A set of position error timings are derived from a servo read of the four (4) bursts as would be appreciated by those having ordinary skill in the art.

Specifically, from left to right, a position error timing AB-1 is generated from a servo read of the first forward-slash stripe of the A-burst and the first backward-slash stripe of the B-burst. A position error timing AB-2 is generated from a servo read of the second forward-slash stripe of the A-burst and the second backward-slash stripe of the B-burst. A position error timing AB-3 is generated from a servo read of the third forward-slash stripe of the A-burst and the third backward-slash stripe of the B-burst. A position error timing AB-4 is generated from a servo read of the fourth forward-slash stripe of the A-burst and the fourth backward-slash stripe of the B-burst. A position error timing AB-5 is generated from a servo read of the fifth forward-slash stripe of the A-burst and the fifth backward-slash stripe of the B-burst.

Further, continuing from left to right, a position error timing CD-1 is generated from a servo read of the first forward-slash stripe of the C-burst and the first backward-slash stripe of the D-burst. A position error timing CD-2 is generated from a servo read of the second forward-slash stripe of the C-burst and the second backward-slash stripe of the D-burst. A position error timing CD-3 is generated from a servo read of the third forward-slash stripe of the C-burst and the third backward-slash stripe of the D-burst. A position error timing CD-4 is generated from a servo read of the fourth forward-slash stripe of the C-burst and the fourth backward-slash stripe of the D-burst.

A servo position error signal $SPER_1$ based on this set of position error timings is determined in accordance with the following equation [1] whereby servo position error signal $SPER_1$ is inclusive of noise $N_{AB(i)}$ due to a non-zero summation of the noise associated with the AB position error timing signals and the noise $N_{CD(i)}$ associated with the CD position error timing signals:

$$SPER_1 = \Sigma[AB(i) + N_{AB(i)}] + \Sigma[CD(i) + N_{CD(i)}] \quad [1]$$

Figure 4:
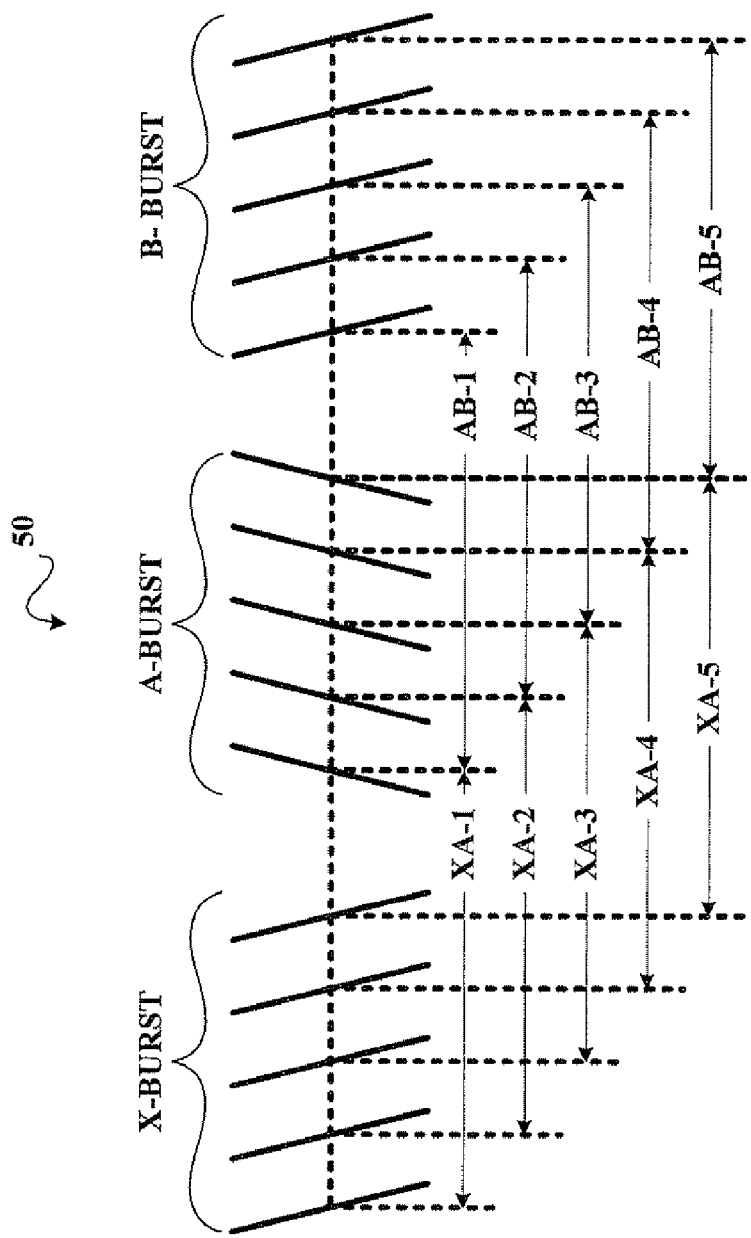
FIG. 4 illustrates an exemplary set of position error timings based on a first embodiment of a differential timing based servo pattern in accordance with the present invention.

FIG. 4 illustrates an exemplary differential timing based servo pattern 50 of the present invention. Differential timing based servo pattern 50 can include a differential X-burst of five (5) backward-slash stripes (\\\\\), a standard A-burst of five (5) forward-slash stripes (//////), a standard B-burst of five (5) backward-slash stripes (\\\\\). A set of position error timings are generated from a servo read of the three (3) burst as would be appreciated by those having ordinary skill in the art.

Specifically, from left to right, a position error timing XA-1 is generated from a servo read of the first backward-slash stripe of the X-burst and the first forward-slash stripe of the A-burst. A position error timing XA-2 is generated from a servo read of the second backward-slash stripe of the X-burst and the second forward-slash stripe of the A-burst. A position error timing XA-3 is generated from a servo read of the third backward-slash stripe of the X-burst and the third forward-slash stripe of the A-burst. A position error timing XA-4 is generated from a servo read of the fourth backward-slash stripe of the X-burst and the fourth forward-slash stripe of the A-burst. A position error timing XA-5 is generated from a servo read of the fifth backward-slash stripe of the X-burst and the fifth forward-slash stripe of the A-burst.

Further, continuing from left to right, a position error timing AB-1 is generated from a servo read of the first forward-slash stripe of the A-burst and the first backward-slash stripe of the B-burst. A position error timing AB-2 is generated from a servo read of the second forward-slash stripe of the A-burst and the second backward-slash stripe of the B-burst. A position error timing AB-3 is generated from a servo read of the third forward-slash stripe of the A-burst and the third backward-slash stripe of the B-burst. A position error timing AB-4 is generated from a servo read of the fourth forward-slash stripe of the A-burst and the fourth backward-slash stripe of the B-burst. A position error timing AB-5 is generated from a servo read of the fifth forward-slash stripe of the A-burst and the fifth backward-slash stripe of the B-burst.

A servo position error signal $SPER_2$ based on this set of position error timings is determined in accordance with the following equation [2] whereby servo position error signal $SPER_2$ is exclusive of noise due to a zero differential of the noise $N_{XA(i)}$ associated with the XA position error timing signals and the noise $N_{AB(i)}$ associated with the AB position error timing signals (assuming all noise is equal):

$$SPER_2 = \Sigma[AB(i) + N_{AB(i)}] - \Sigma[XA(i) + N_{XA(i)}] \quad [2]$$

Figure 5:
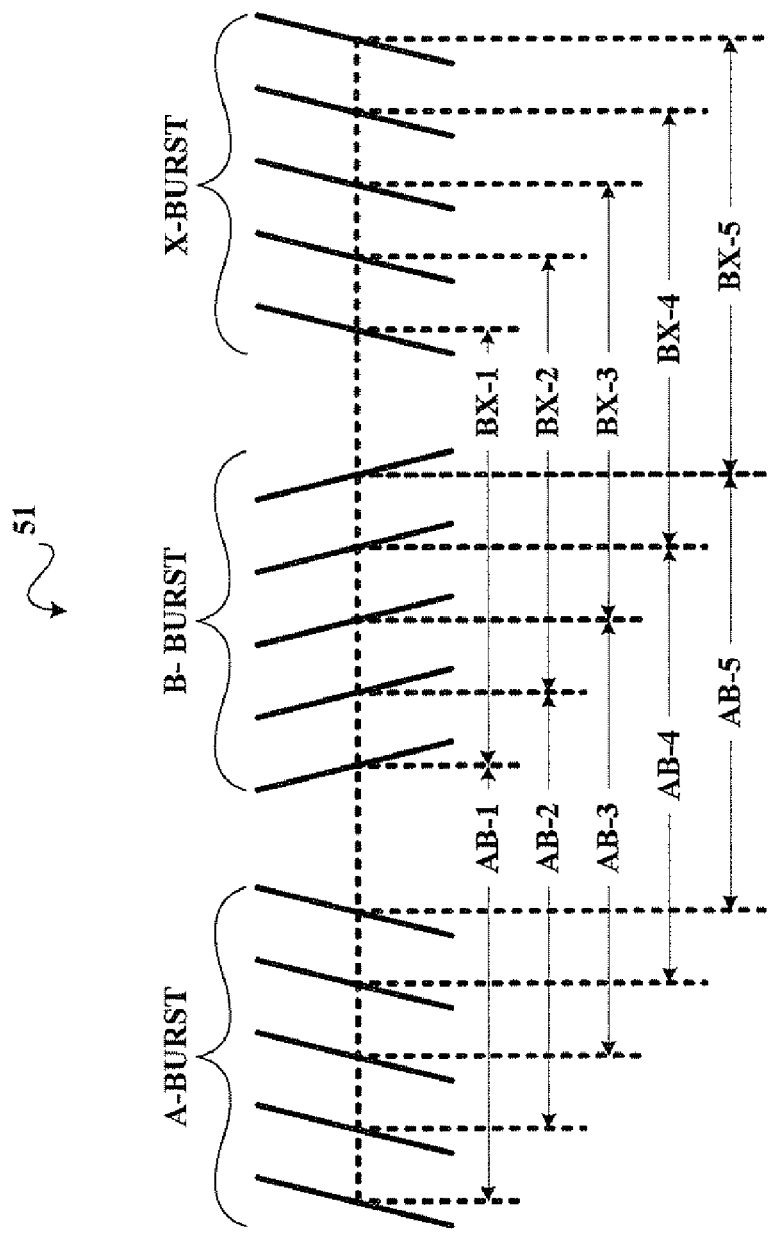
FIG. 5 illustrates an exemplary set of position error timings based on a second embodiment of a differential timing based servo pattern in accordance with the present invention.

FIG. 5 illustrates an exemplary differential timing based servo pattern 51 of the present invention. Differential timing based servo pattern 51 sequentially includes a standard A-burst of five (5) forward-slash stripes (//////), a standard B-burst of five (5) backward-slash stripes (\\\\\) and a differential X-burst of five (5) forward-slash stripes (\\\\\). A set of timings are generated from a servo read of the three (3) burst as would be appreciated by those having ordinary skill in the art.

Specifically, from left to right, a timing AB-1 is generated from a servo read of the first forward-slash stripe of the A-burst and the first backward-slash stripe of the B-burst. A timing AB-2 is generated from a servo read of the second forward-slash stripe of the A-burst and the second backward-slash stripe of the B-burst. A timing AB-3 is generated from a servo read of the third forward-slash stripe of the A-burst and the third backward-slash stripe of the B-burst. A timing AB-4 is generated from a servo read of the fourth forward-slash stripe of the A-burst and the fourth backward-slash stripe of the B-burst. A timing AB-5 is generated from a servo read of the fifth forward-slash stripe of the A-burst and the fifth backward-slash stripe of the B-burst.

Further, continuing from left to right, a timing BX-1 is generated from a servo read of the first backward-slash stripe of the B-burst and the first forward-slash stripe of the X-burst. A timing BX-2 is generated from a servo read of the second backward-slash stripe of the B-burst and the second forward-slash stripe of the X-burst. A timing BX-3 is generated from a servo read of the third backward-slash stripe of the B-burst and the third forward-slash stripe of the X-burst. A timing BX-4 is generated from a servo read of the fourth backward-slash stripe of the B-burst and the fourth forward-slash stripe of the X-burst. A timing BX-5 is generated from a servo read of the fifth backward-slash stripe of the B-burst and the fifth forward-slash stripe of the X-burst.

A servo position error signal $SPER_3$ based on this set of timings is determined in accordance with the following equation [3] whereby servo position error signal $SPER_3$ is exclusive of noise due to a zero differential of the noise $N_{AB(i)}$ associated with the AB position error timing signals and the noise $N_{BX(i)}$ associated with the BX position error timing signals (assuming all noise is equal):

$$SPER_3 = \Sigma[AB(i)+N_{AB(i)}] - \Sigma[BX(i)+N_{BX(i)}] \qquad [3]$$

Figure 6:
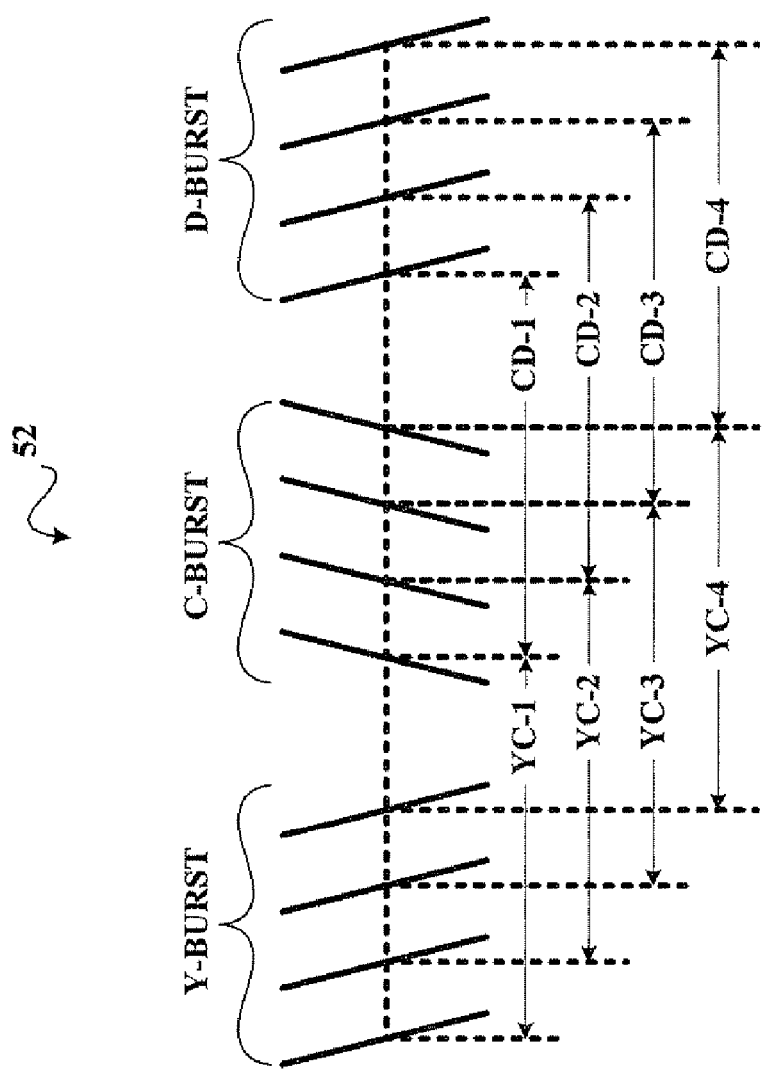
FIG. 6 illustrates an exemplary set of position error timings based on a third embodiment of a differential timing based servo pattern in accordance with the present invention.

FIG. 6 illustrates an exemplary differential timing based servo pattern 52 of the present invention. Differential timing based servo pattern 51 includes a differential Y-burst of four (4) backward-slash stripes (\\\\), a standard C-burst of four (4) forward-slash stripes (////), a standard D-burst of four (4) backward-slash stripes (\\\\). A set of position error timings are generated from a servo read of the three (3) burst as would be appreciated by those having ordinary skill in the art.

Specifically, from left to right, a position error timing YC-1 is generated from a servo read of the first backward-slash stripe of the Y-burst and the first forward-slash stripe of the C-burst. A position error timing YC-2 is generated from a servo read of the second backward-slash stripe of the Y-burst and the second forward-slash stripe of the C-burst. A position error timing YC-3 is generated from a servo read of the third backward-slash stripe of the Y-burst and the third forward-slash stripe of the C-burst. A position error timing YC-4 is generated from a servo read of the fourth backward-slash stripe of the Y-burst and the fourth forward-slash stripe of the C-burst.

Further, continuing from left to right, a position error timing CD-1 is generated from a servo read of the first forward-slash stripe of the C-burst and the first backward-slash stripe of the D-burst. A position error timing CD-2 is generated from a servo read of the second forward-slash stripe of the C-burst and the second backward-slash stripe of the D-burst. A position error timing CD-3 is generated from a servo read of the third forward-slash stripe of the C-burst and the third backward-slash stripe of the D-burst. A position error timing CD-4 is generated from a servo read of the fourth forward-slash stripe of the C-burst and the fourth backward-slash stripe of the D-burst.

A servo position error signal $SPER_4$ based on this set of position error timings is determined in accordance with the following equation [4] whereby servo position error signal $SPER_3$ is exclusive of noise due to a zero differential of the noise $N_{YC(i)}$ associated with the YC position error timing signals and the noise $N_{CD(i)}$ associated with the CD position error timing signals (assuming all noise is equal):

$$SPER_4 = \Sigma[CD(i)+N_{CD(i)}] - \Sigma[YC(i)+N_{YC(i)}] \qquad [4]$$

Figure 7:
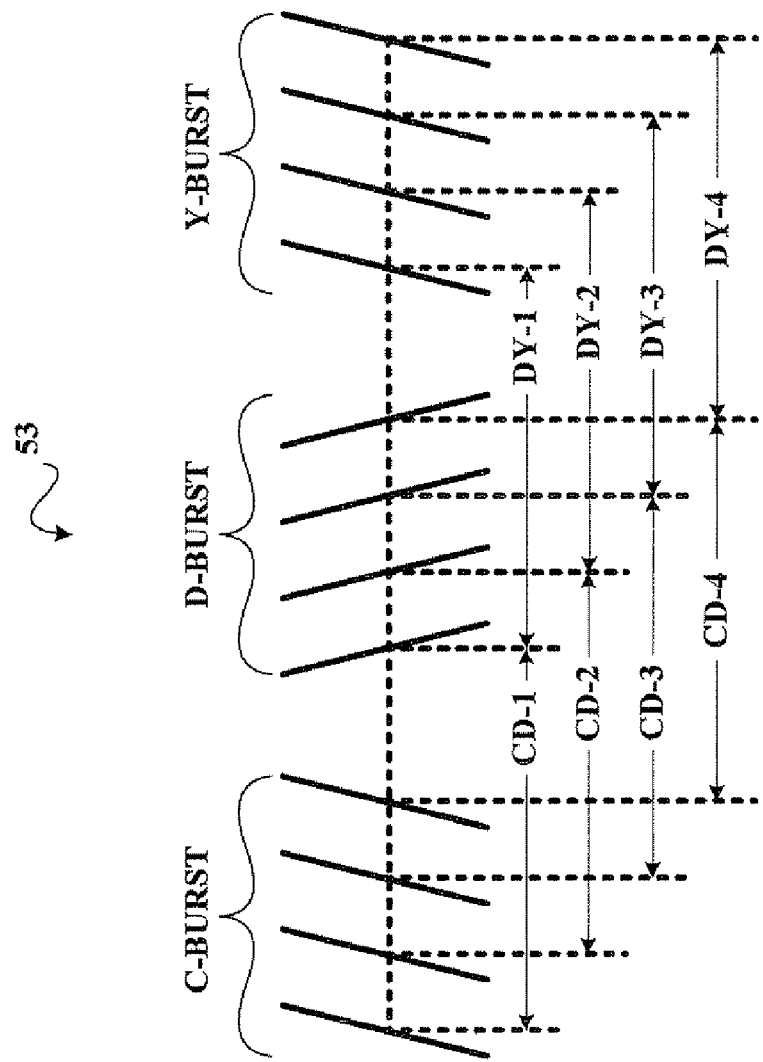
FIG. 7 illustrates an exemplary set of position error timings based on a fourth embodiment of a differential timing based servo pattern in accordance with the present invention.

FIG. 7 illustrates an exemplary differential timing based servo pattern 53 of the present invention. Differential timing based servo pattern 51 includes a standard C-burst of four (4) forward-slash stripes (////), a standard D-burst of four (4) backward-slash stripes (\\\\) and a differential Y-burst of four (4) forward-slash stripes (\\\\). A set of timings are generated from a servo read of the three (3) burst as would be appreciated by those having ordinary skill in the art.

Specifically, from left to right, a timing CD-1 is generated from a servo read of the first forward-slash stripe of the C-burst and the first backward-slash stripe of the D-burst. A timing CD-2 is generated from a servo read of the second forward-slash stripe of the C-burst and the second backward-slash stripe of the D-burst. A timing CD-3 is generated from a servo read of the third forward-slash stripe of the C-burst and the third backward-slash stripe of the D-burst. A timing CD-4 is generated from a servo read of the fourth forward-slash stripe of the C-burst and the fourth backward-slash stripe of the D-burst. A timing CD-5 is generated from a servo read of the fifth forward-slash stripe of the C-burst and the fifth backward-slash stripe of the D-burst.

Further, continuing from left to right, a timing DY-1 is generated from a servo read of the first backward-slash stripe of the D-burst and the first forward-slash stripe of the Y-burst. A timing DY-2 is generated from a servo read of the second backward-slash stripe of the D-burst and the second forward-slash stripe of the Y-burst. A timing DY-3 is generated from a servo read of the third backward-slash stripe of the D-burst and the third forward-slash stripe of the Y-burst. A timing DY-4 is generated from a servo read of the fourth backward-slash stripe of the D-burst and the fourth forward-slash stripe of the Y-burst.

A servo position error signal $SPER_5$ based on this set of timings is determined in accordance with the following equation [5] whereby servo position error signal $SPER_5$ is exclusive of noise due to a zero differential of the noise $N_{CD(i)}$ associated with the CD position error timing signals and the noise $N_{DY(i)}$ associated with the DY position error timing signals (assuming all noise is equal):

$$SPER_5 = \Sigma[CD(i)+N_{CD(i)}] - \Sigma[DY(i)+N_{DY(i)}] \qquad [5]$$

Referring to FIG. 1, in practice, the present invention does not impose any limitations or any restrictions as to the format of magnetic north-pole polarity differential timing based servo pattern 22 and as to the format of magnetic south-pole polarity differential timing based servo pattern 32. As such, the following description of exemplary embodiments of pattern 22 as shown in FIGS. 8, 10, 12 and 14 does not limit nor restrict the scope of the formats of patterns 22 and 32.

FIG. 8 illustrates a differential timing based servo embodiment of the present invention. In this embodiment, from left-to-right, a magnetic north-pole polarity differential timing based servo pattern 22(1) includes a composite of differential timing based servo pattern 50 (FIG. 4) with a magnetic north-pole polarity and differential timing based servo pattern 53 (FIG. 7) with a magnetic north-pole polarity. In operation, a servo read of magnetic south-north servo band section 20(1) generates magnetic north-pole polarity servo position signals 24(1) as shown in FIG. 9 that are representative of the differential time based servo format of magnetic north-pole polarity servo pattern 22(1). Magnetic north-pole polarity servo position signals 24(1) represent magnetic polarity decoded servo position information 25(1) for facilitating a determination of a translational position of a servo transducer (e.g., a transducer 90 shown in FIG. 20) along a translation axis Y as would be appreciated by those having ordinary skill in the art. Magnetic polarity decoded servo position information 25(1) may also facilitate a determination of a coarse transducing position of the servo transducer along a transducing axis X as would be appreciated by those having ordinary skill in the art.

A servo position error signal $SPER_6$ based a set of position error timings derived from magnetic north-pole polarity servo position signals 24(1) is determined in accordance with the following equations [2], [5] and [6] whereby servo position error signal $SPER_5$ is exclusive of noise due to a zero differential of the noise $N_{XA(i)}$ associated with the XA position error timing signals and the noise $N_{AB(i)}$ associated with the AB position error timing signals (assuming all noise is equal) and due to a zero differential of the noise $N_{CD(i)}$ associated with the CD position error timing signals and the noise $N_{DY(i)}$ associated with the DY position error timing signals (assuming all noise is equal):

$$SPER_2=\Sigma[AB(i)+N_{AB(i)}]-\Sigma[XA(i)+N_{XA(i)}] \quad [2]$$

$$SPER_5=\Sigma[CD(i)+N_{CD(i)}]-\Sigma[DY(i)+N_{DY(i)}] \quad [5]$$

$$SPER_6=SPER_2+SPER_5 \quad [6]$$

Figures 10, 11:
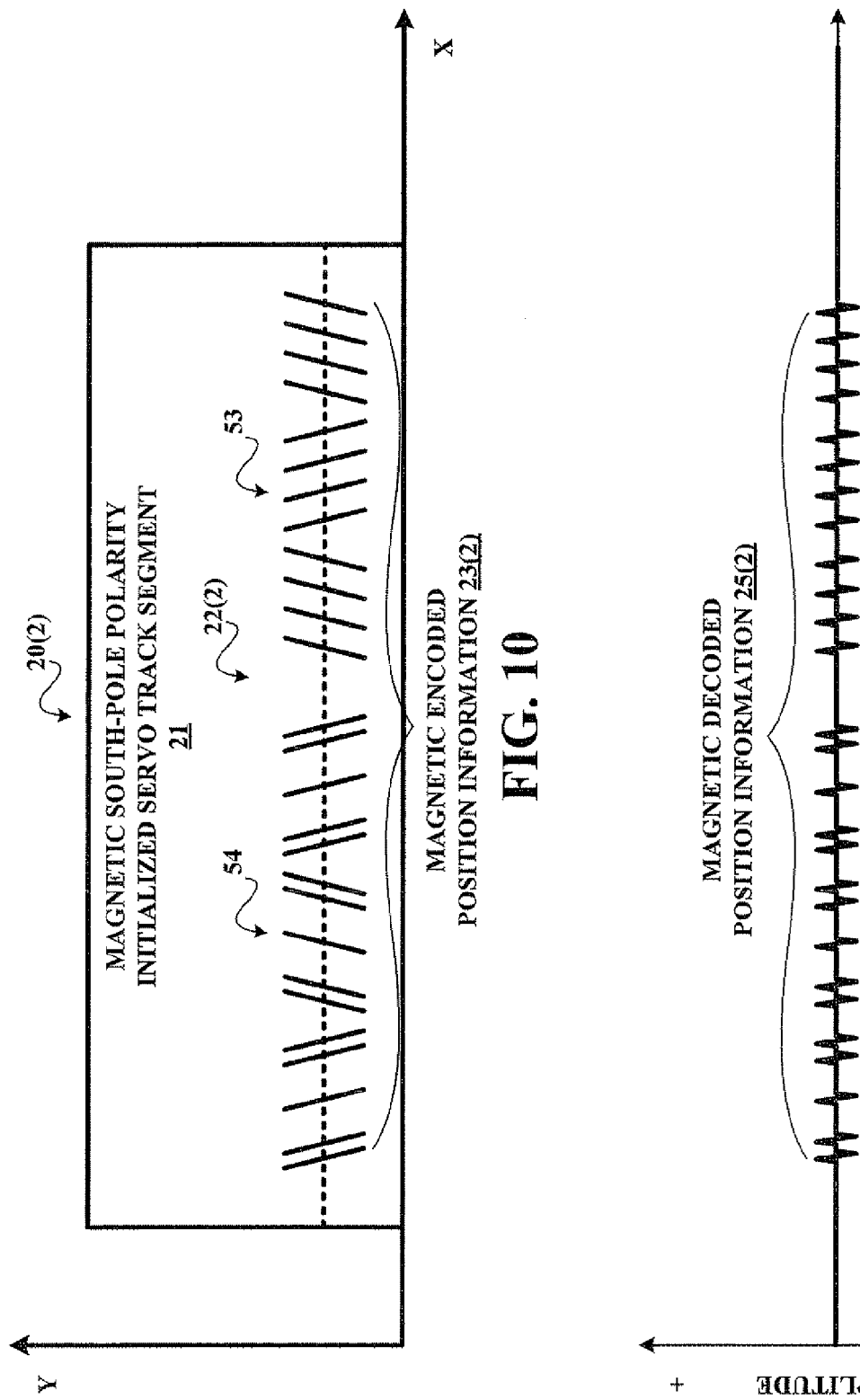
FIG. 10 illustrates a second exemplary embodiment of the magnetic encoded servo position information illustrated in FIG. 1 in accordance with the present invention.
FIG. 11 illustrates exemplary magnetic polarity decoded servo position information associated with the magnetic encoded servo position information illustrated in FIG. 10 in accordance with the present invention.

FIG. 10 illustrates a differential timing based servo embodiment of the present invention. In this embodiment, from left-to-right, a magnetic north-pole polarity differential timing based servo pattern 22(2) includes a composite of a differential timing based servo pattern 54 and differential timing based servo pattern 53 (FIG. 7) with a magnetic north-pole polarity. Differential timing based servo pattern 54 is an alphanumeric "1" encoding version of differential timing based servo pattern 50 (FIG. 4) with a magnetic north-pole polarity.

In operation, a servo read of magnetic south-north servo band section 20(2) generates magnetic north-pole polarity servo position signals 24(2) as shown in FIG. 11 that are representative of the differential time based servo format of magnetic north-pole polarity servo pattern 22(2). Magnetic north-pole polarity servo position signals 24(2) represent magnetic polarity decoded servo position information 25(2) for facilitating a determination of a translational position of a servo transducer (not shown) along a translation axis Y as would be appreciated by those having ordinary skill in the art. Magnetic polarity decoded servo position information 25(2) also facilitates a determination of a refined transducing position of the servo transducer along a transducing axis X as would be appreciated by those having ordinary skill in the art.

A servo position error signal of this embodiment based on a set of position error timings derived from magnetic north-pole polarity servo position signals 24(2) is determined in accordance with the previously described equations [2], [5] and [6] whereby the servo position error signal is exclusive of noise due to a zero differential of the noise $N_{XA(i)}$ associated with the XA position error timing signals and the noise $N_{AB(i)}$ associated with the AB position error timing signals (assuming all noise is equal) and due to a zero differential of the noise $N_{CD(i)}$ associated with the CD position error timing signals and the noise $N_{DY(i)}$ associated with the DY position error timing signals (assuming all noise is equal).

Figure 12:
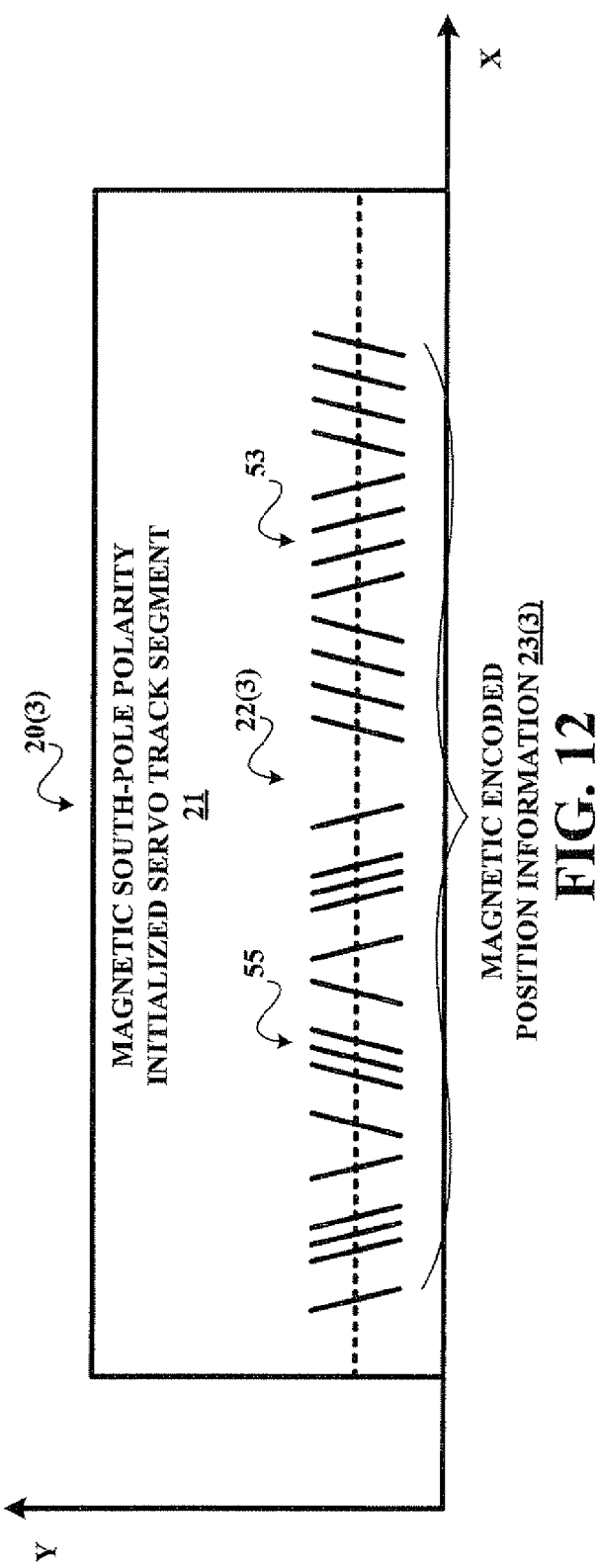
FIG. 12 illustrates a third exemplary embodiment of the magnetic encoded servo position information illustrated in FIG. 1 in accordance with the present invention.

FIG. 12 illustrates a differential timing based servo embodiment of the present invention. In this embodiment, from left-to-right, a magnetic north-pole polarity differential timing based servo pattern 22(3) includes a composite of a differential timing based servo pattern 55 and differential timing based servo pattern 53 (FIG. 7) with a magnetic north-pole polarity. Differential timing based servo pattern 55 is an alphanumeric "0" encoding version of differential timing based servo pattern 50 (FIG. 4) with a magnetic north-pole polarity.

Figure 13:
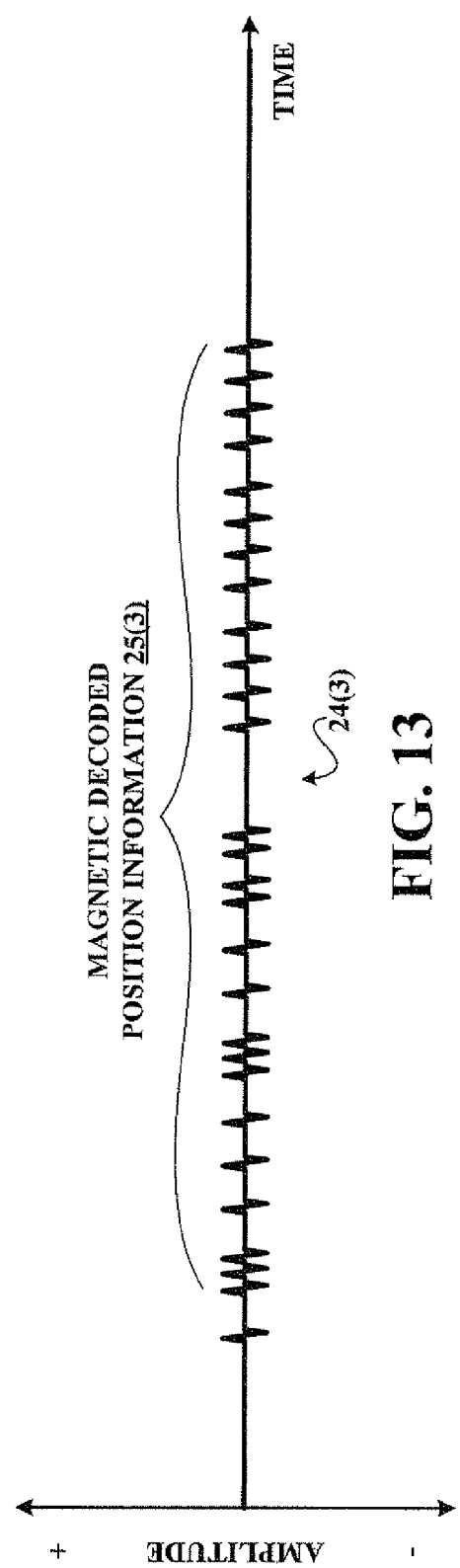
FIG. 13 illustrates exemplary magnetic polarity decoded servo position information associated with the magnetic encoded servo position information illustrated in FIG. 12 in accordance with the present invention.

In operation, a servo read of magnetic south-north servo band section 20(3) generates magnetic north-pole polarity servo position signals 24(3) as shown in FIG. 13 that are representative of the differential time based servo format of magnetic north-pole polarity servo pattern 22(3). Magnetic north-pole polarity servo position signals 24(3) represent magnetic polarity decoded servo position information 25(3) for facilitating a determination of a translational position of a servo transducer (not shown) along a translation axis Y as would be appreciated by those having ordinary skill in the art. Magnetic polarity decoded servo position information 25(3) also facilitates a determination of a refined transducing position of the servo transducer along a transducing axis X as would be appreciated by those having ordinary skill in the art.

A servo position error signal of this embodiment based on a set of position error timings derived from magnetic north-pole polarity servo position signals 24(3) is determined in accordance with the previously described equations [2], [5] and [6] whereby the servo position error signal is exclusive of noise due to a zero differential of the noise $N_{XA(i)}$ associated with the XA position error timing signals and the noise $N_{AB(i)}$ associated with the AB position error timing signals (assuming all noise is equal) and due to a zero differential of the noise $N_{CD(i)}$ associated with the CD position error timing signals and the noise $N_{DY(i)}$ associated with the DY position error timing signals (assuming all noise is equal).

Figure 14:
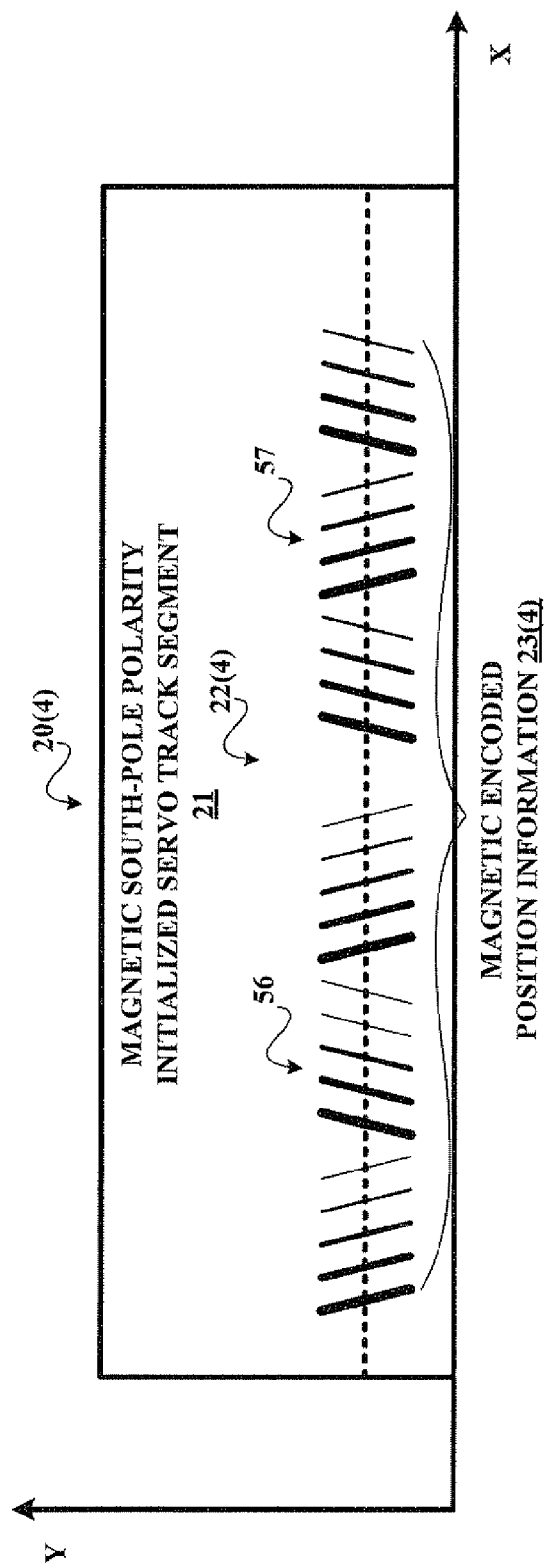
FIG. 14 illustrates a fourth exemplary embodiment of the magnetic encoded servo position information illustrated in FIG. 1 in accordance with the present invention.

FIG. 14 illustrates a differential timing based servo embodiment of the present invention. In this embodiment, from left-to-right, a magnetic north-pole polarity differential timing based servo pattern 22(4) includes a composite of a differential timing based servo pattern 56 and a differential timing based servo pattern 57. Differential timing based servo pattern 56 is a magnetic intensity encoding version of differential timing based servo pattern 50 (FIG. 4) with a magnetic north-pole polarity. Differential timing based servo pattern 57 is a magnetic intensity encoding version of differential timing based servo pattern 53 (FIG. 7) with a magnetic north-pole polarity.

Figure 15:
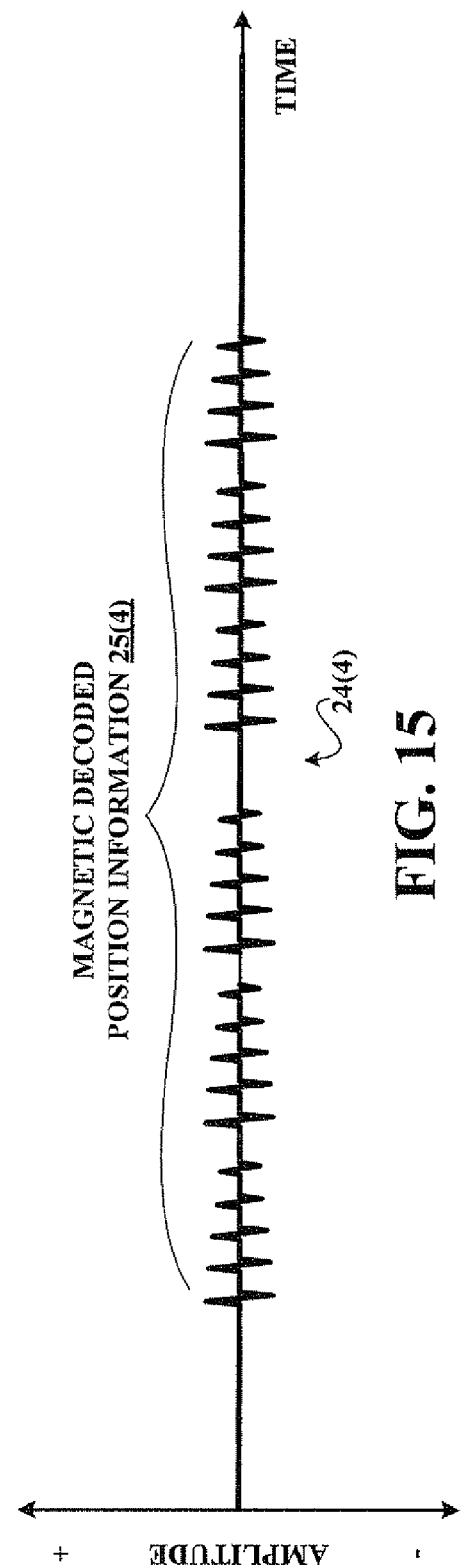
FIG. 15 illustrates exemplary magnetic polarity decoded servo position information associated with the magnetic encoded servo position information illustrated in FIG. 14 in accordance with the present invention.

In operation, a servo read of magnetic south-north servo band section 20(4) generates magnetic north-pole polarity servo position signals 24(4) as shown in FIG. 15 that are representative of the differential time based servo format of magnetic north-pole polarity servo pattern 22(4). Magnetic north-pole polarity servo position signals 24(4) represent magnetic polarity decoded servo position information 25(4) for facilitating a determination of a translational position of a servo transducer (not shown) along a translation axis Y as would be appreciated by those having ordinary skill in the art. Magnetic polarity decoded servo position information 25(4) also facilitates a determination of a refined transducing position of the servo transducer along a transducing axis X as would be appreciated by those having ordinary skill in the art.

A servo position error signal of this embodiment based on a set of position error timings derived from magnetic north-pole polarity servo position signals 24(4) is determined in accordance with the previously described equations [2], [5] and [6] whereby the servo position error signal is exclusive of noise due to a zero differential of the noise $N_{XA(i)}$ associated with the XA position error timing signals and the noise $N_{AB(i)}$ associated with the AB position error timing signals (assuming all noise is equal) and due to a zero differential of the noise $N_{CD(i)}$ associated with the CD position error timing signals and the noise $N_{DY(i)}$ associated with the DY position error timing signals (assuming all noise is equal).

Referring to FIG. 1, those having ordinary skill in the art will appreciate the unlimited variations in servo patterns 20 and 30 as evidenced by FIGS. 8, 10, 12 and 14. Those having ordinary skill in the art will further appreciate the numerous advantages of the present invention, such as, for example, an ability to implement a servo control system in an uncomplicated yet innovative manner.

Figure 16:
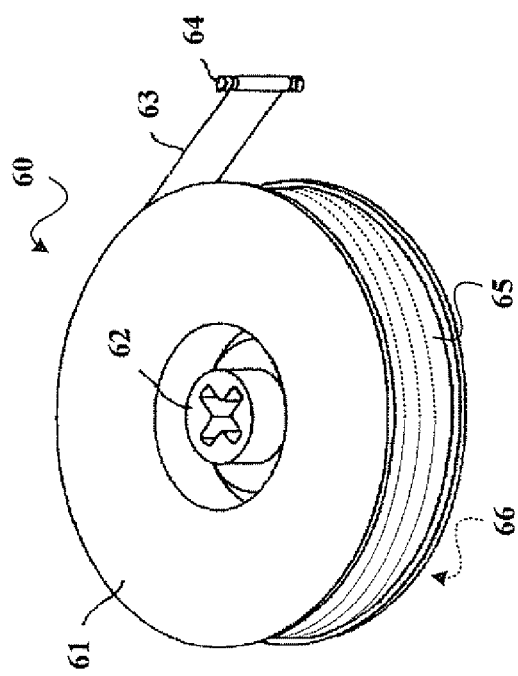
FIG. 16 illustrates one embodiment of a tape storage media in accordance with the present invention.
Figure 17:
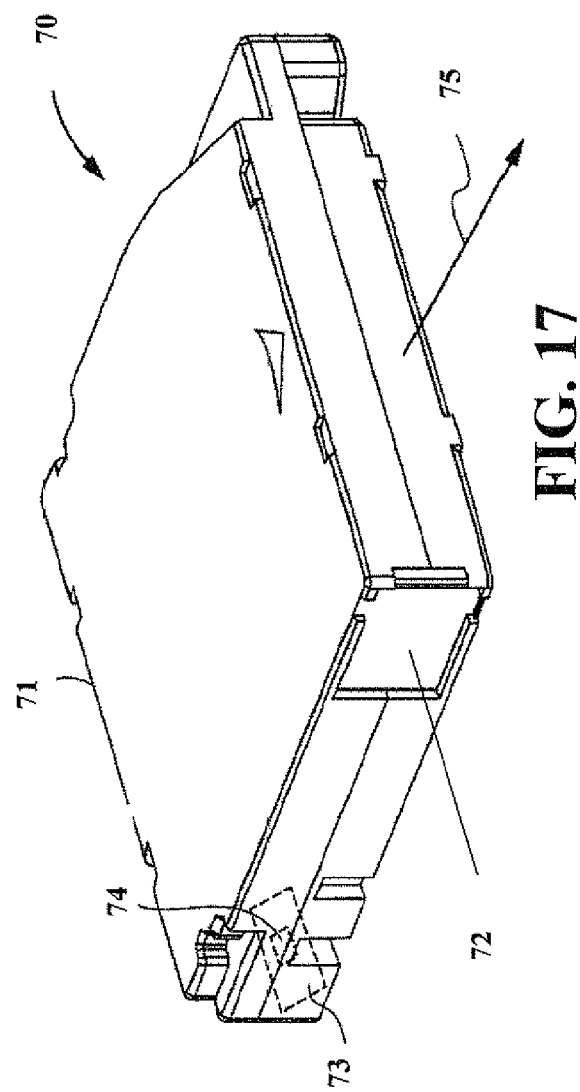
FIG. 17 illustrates one embodiment of a tape storage media cartridge in accordance with the present invention.

FIGS. 16 and 17 respectively illustrate a tape storage media 60 as an exemplary form of a magnetic storage media for practicing the inventive principles of the present invention as previously described herein, and a tape storage cartridge 70 as an exemplary form of a magnetic storage cartridge for practicing the inventive principles of the present invention as previously described herein. Tape storage media 60 is contained with a shell housing 71 of tape storage cartridge 70 that is adapted to interface with a tape drive (not shown).

Specifically, tape cartridge 70 includes exterior cartridge shell 71 and sliding door 72. Sliding door 72 is slid open when tape cartridge 70 is inserted into a tape drive (not shown). Sliding door 72 is normally closed when tape cartridge 70 is not in use, so that debris and contaminants do not enter tape cartridge 70 and degrade tape storage media 60. The direction that tape cartridge 70 is slid into the tape drive is shown as direction 75. Tape cartridge 70 also contains a cartridge memory 74, which is on a printed circuit board 73. Cartridge memory 74 is preferably at a 45° angle, to allow the tape drive and pickers of an automated storage library (not shown) to access the contents of cartridge memory 74.

Tape storage media 60 includes a tape reel 61, which is prevented from rotation by a brake button 62 when tape cartridge 70 is inserted in a tape drive (not shown). The tape drive releases brake button 62 when tape cartridge 70 is inserted into the tape drive, which then allows the free rotation of tape reel 61. Tape reel 61 is wound with tape 65, which is preferably magnetic tape. Alternatively, tape 65 could equally be magneto-optical or optical phase-change tape. On the free end of tape 65 is an optional leader tape 63 and leader pin 64. When tape cartridge 70 is slid into the tape drive, sliding door 72 is opened, and the tape drive threads leader pin 64 and attached leader tape 63 and tape 65 through the tape path. Tape 65 may be a data tape or a cleaner tape. Tape 65 may use the identical formulation of tape for both data and cleaning purposes. The contents of cartridge memory 74 are used to distinguish tape cartridge 70 as either a data cartridge or a cleaner cartridge. Optional leader tape 63 is preferably a thicker section of tape 65 which better withstands the load/unload operations of the tape drive.

As related to the a servo control of tape 65, servo tracks 66 are recorded on tape 65 in accordance with the inventive principles of the present invention. In particular, one or more servo bands implementing a version of the FIG. 1 servo band embodiment and/or a version of the FIG. 2 servo band embodiment are recorded on servo tracks 66 to thereby facilitate an advantageous execution of a servo control of tape 65.

Figure 18:
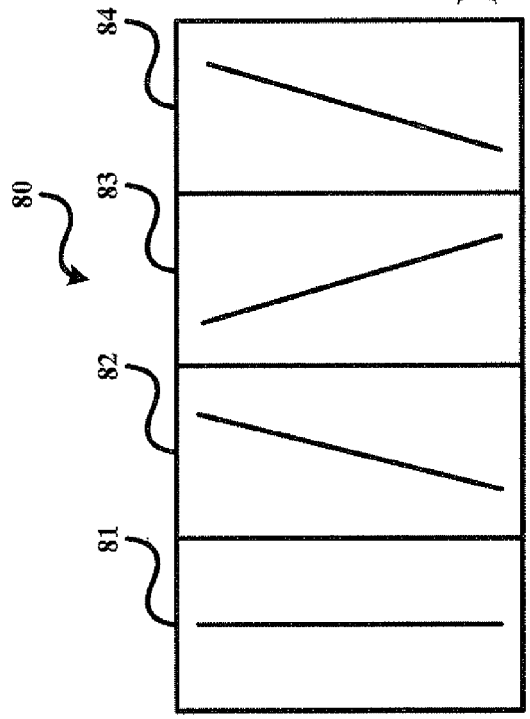
FIG. 18 illustrates a first embodiment of a servo write head in accordance with the present invention.
Figure 19:
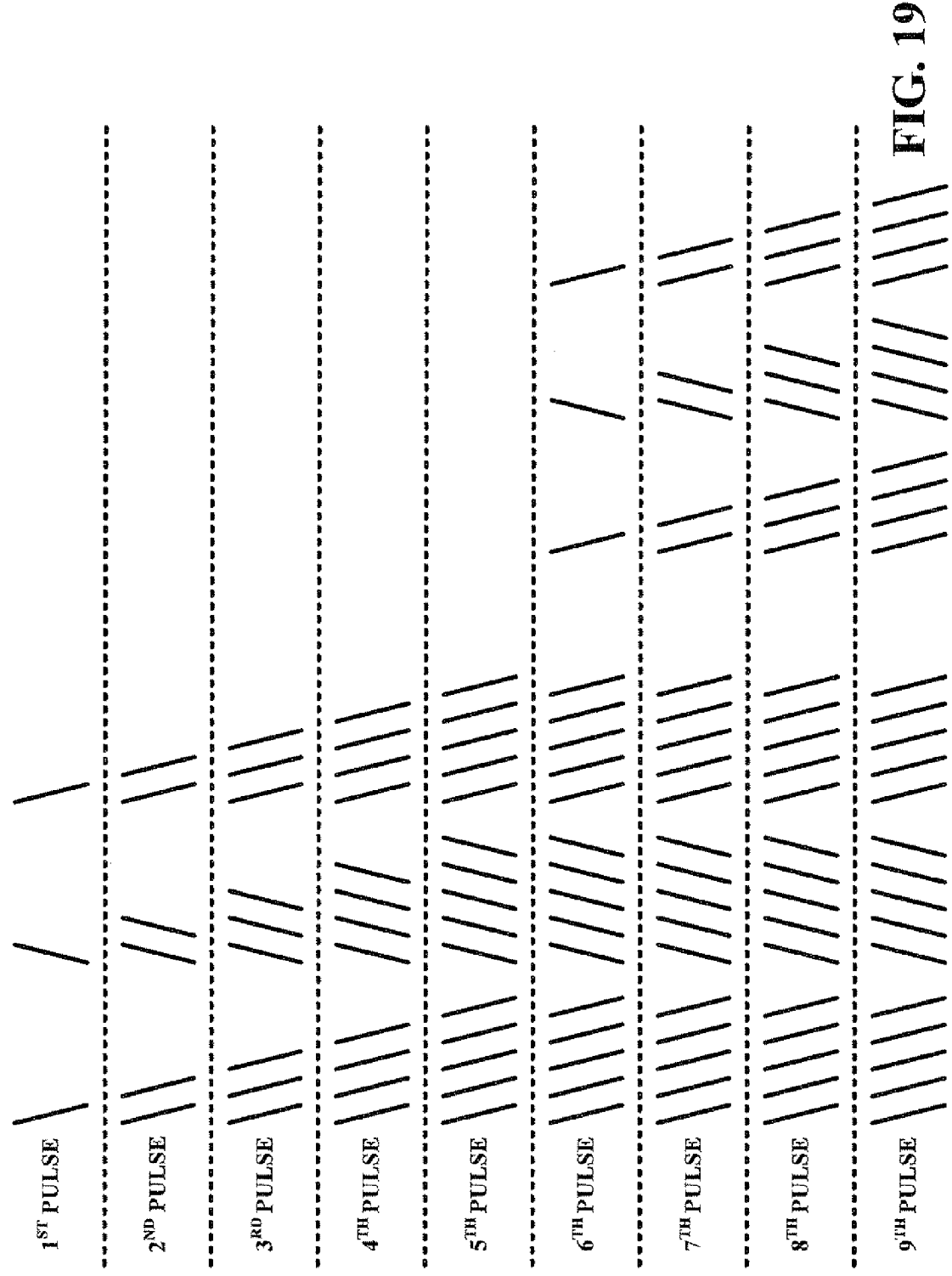
FIG. 19 illustrates an exemplary writing of an XAB burst pattern and a YCD pattern in accordance with the present invention.

FIG. 18 illustrates a servo write head 80 as an exemplary form of a servo write head for practicing the inventive principles of the present invention as previously described herein as related to FIGS. 4 and 6. Servo write head 80 includes an erase element 81, a backward-slash stripe write element 82, a forward-slash stripe write element 83 and a backward-slash stripe write element 84. In operation, a servo track segment of a magnetic storage media (e.g., media 60) is initialized in either a magnetic north-pole polarity or a magnetic south-pole polarity by a selectively pre-erasing of the servo track segment in either a magnetic north-pole polarity or a magnetic south-pole polarity. Next, a version of a time based servo pattern of the present invention can be recorded in the opposite magnetic polarity onto the pre-erased servo track segment. In an alternate embodiment, an additional element 81 (not shown) is added next to stripe write element 84 to facilitate an erasing and writing of the timing based servo pattern in either direction of magnetic tape 65. Elements 82-84 of servo write head 80 are simultaneously electrically triggered five (5) separate times to generate the XAB pattern 50 (FIG. 4) and then four (4) separate times to generate the YCD pattern 52 (FIG. 6) as exemplary shown in FIG. 19.

Figure 20:
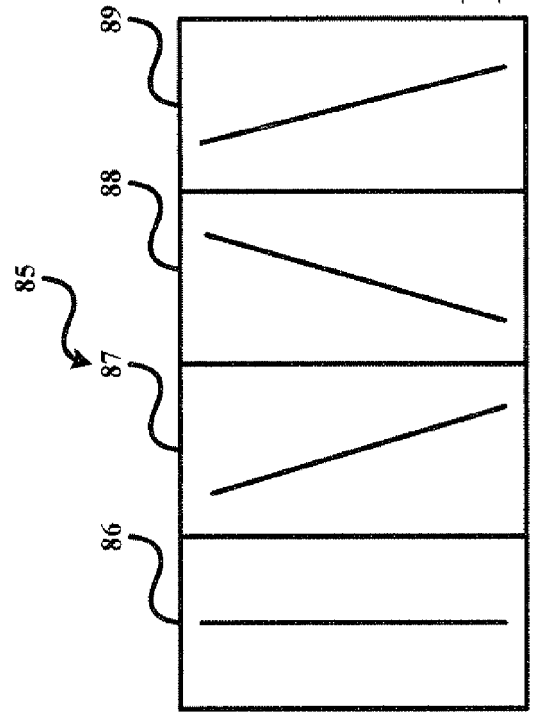
FIG. 20 illustrates a second embodiment of a servo write head in accordance with the present invention.
Figure 21:
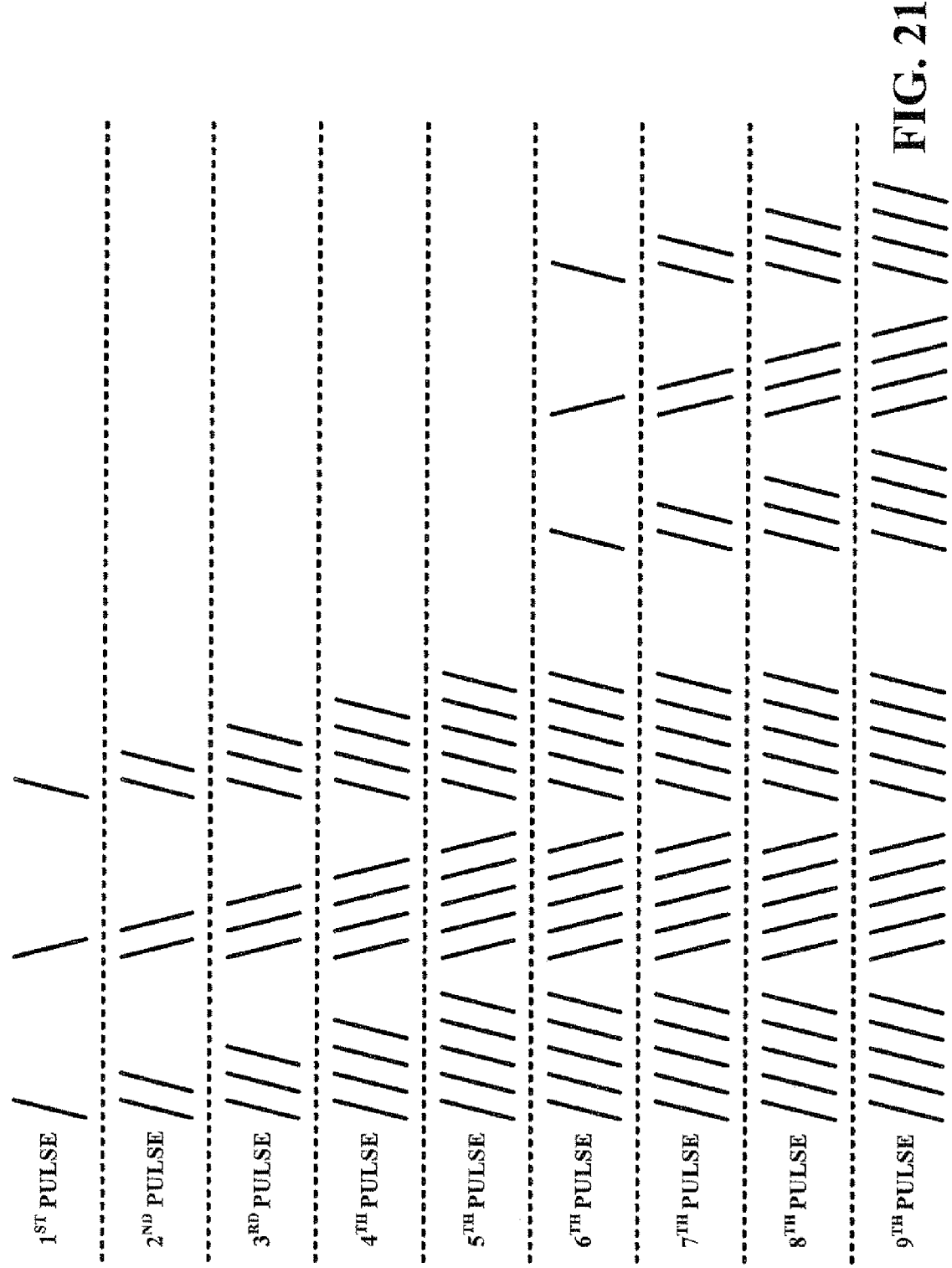
FIG. 21 illustrates an exemplary writing of an ABX burst pattern and a CDY pattern in accordance with the present invention.

FIG. 20 illustrates a servo write head 85 as an exemplary form of a servo write head for practicing the inventive principles of the present invention as previously described herein as related to FIGS. 5 and 7. Servo write head 85 includes an erase head 86, a forward-slash stripe element 87, a backward-slash stripe write element 88 and a forward-slash stripe write element 89. In operation, a servo track segment of a magnetic storage media (e.g., media 60) is initialized in either a magnetic north-pole polarity or a magnetic south-pole polarity by a selectively pre-erasing of the servo track segment in either a magnetic north-pole polarity or a magnetic south-pole polarity. Next, a version of a time based servo pattern of the present invention can be recorded in the opposite magnetic polarity onto the pre-erases servo track segment. In an alternate embodiment, an additional element 86 (not shown) is added next to stripe write element 89 to facilitate an erasing and writing of the timing based servo pattern in either direction of magnetic tape 65. Elements 87-89 of servo write head 80 are simultaneously electrically triggered five (5) separate times to generate the ABX pattern 51 (FIG. 5) and then four (4) separate times to generate the CDY pattern 53 (FIG. 7) as exemplary shown in FIG. 21.

Referring to FIGS. 18 and 20, in an alternative embodiment, elements 82-84 of servo write head 80 can be simultaneously electrically triggered five (5) separate times to generate the XAB pattern 50 (FIG. 4) and then elements 87-89 can be simultaneously electrically triggered four (4) separate times to generate the CDY pattern 53 (FIG. 7). In yet another alternative embodiment, elements 87-89 of servo write head 80 can be simultaneously electrically triggered five (5) separate times to generate the ABX pattern 51 (FIG. 5) and then elements 82-84 can be simultaneously electrically triggered four (4) separate times to generate the YCD pattern 52 (FIG. 6).

Figure 22:
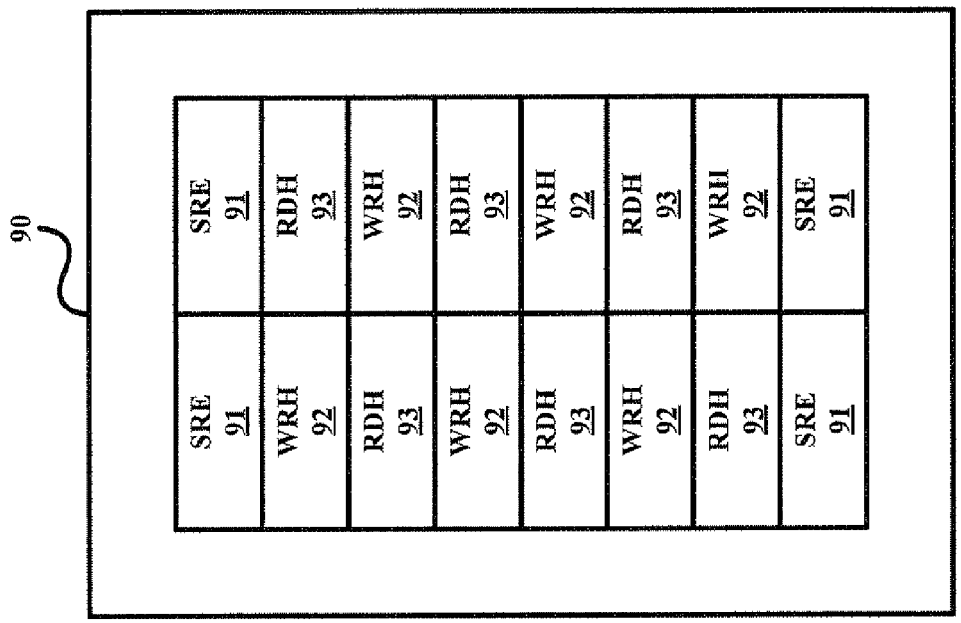
FIG. 22 illustrates one embodiment of a servo transducer in accordance with the present invention.

FIG. 22 illustrates a servo transducer 90 as an exemplary form of a servo transducer for practicing the inventive principles of the present invention as previously described herein. Servo transducer 90 includes servo read elements ("SRE") 91, write heads ("WRH") 92 and read heads ("RDH") 93 in an arrangement that facilitates a use of elements 91 in properly positioning heads 92 and 93 along a desired data track for performing a read-after-write technique as data is being recorded on that data track.

FIGS. 23 and 24 respectively illustrate a front end 101 and rear end 102 of a tape drive 100. Installed within tape drive 100 is a servo control system for positioning a transducer (e.g., transducer 90 shown in FIG. 22) adjacent a surface of a tape storage media (e.g., tape storage media 60 shown in FIG. 16) whereby one or more servo read heads of the transducer are operable to read servo patterns 22 and 32 (FIG. 1) of the present invention as recorded on one or more servo tracks of the tape storage media.

FIG. 25 illustrates an exemplary servo control system of the present invention employing a transducer 110 (e.g., transducer 90 shown in FIG. 22), a servo decoder 111 and a servo controller 114. Transducer 110 includes one or more servo read heads whereby each servo read head is operable to read servo patterns 22 and 32 of the present invention as recorded on a servo track of the tape storage media to thereby generate a read head signal RHS representative of servo patterns 22 and 32. Servo decoder 111 decodes each read head signal RHS and generates a decoded servo position signal DSPS that indicates a position of the corresponding servo read head relative to the tape storage media. Servo controller 114 is operable to generate a servo control signal SCS based on each decoded servo position signal DSPS generated by servo decoder 111 whereby a translation assembly (not shown) of transducer 110 is selectively activated in response to servo control signal SCS to thereby move transducer 110 relative to the tape storage media along translation axis Y as needed.

In order to decode each read head signal RHS, servo decoder 111 employs a peak detector 112 and a valley detector 113 per each servo read head of transducer 110. Each peak detector 112 generates a peak detection signal and each valley detector 113 generates a valley detection signal whereby the peak detection signal(s) and the valley detection signal(s) are further processed to generate the decoded servo position signal(s) DSPS as would be appreciated by those having ordinary skill in the art. Specifically, peak detector 112 and valley detector 113 act in combination to detect the peak-valley-peak-valley representative of position signals 24 (FIG. 2) when servo pattern 22 (FIG. 1) is being read by transducer 110, and to detect valley-peak-valley-peak representative of position signals 34 (FIG. 2) when servo pattern 32 is read by transducer 110. In this way, drive 100 both gathers the decoded servo position signal DSPS and differentiates between a reading of servo pattern 22 (FIG. 1) and a reading of servo pattern 32. For example, peak detector 112 and valley detector 113 act in combination to detect the peak-valley-peak-valley representative 26(1) of position signals 24(1) (FIG. 9) to thereby facilitate an execution of equations [2], [5] and [6] described herein by servo decoder 111, which serves as a basis for a determination of decoded servo position signal DSPS by servo decoder 111. In turn, drive 100 both gathers decoded servo position signal DSPS and determines servo pattern 22(1) is being read by transducer 110. Additionally, the amplitude of the peaks and valleys can be detected to differentiate the signals of position signals 24 (FIG. 2), in particular the signals of position signals 24(4) shown in FIG.15. This applies equally to the signals of position signals 34 (FIG. 2).

Referring to FIGS. 4 and 25, a reading of differential timing based servo pattern 50 by transducer 110 results in a determination by servo decoder 111 of each position error timing XA as a summation of a fixed position error timing component Tfxa and a variable position error timing component Tvxa. The fixed position error timing component Tfxa represents a designed reading of pattern 50 by transducer 110 along a centerline of pattern 50 as represented by the dashed line extending through the X-burst, the A-burst and the B-burst. The fixed position error timing component Tfxa therefore has a predetermined fixed timing magnitude based on the designed spacing of each stripe within the X-burst and the A-burst as well as the designed spacing between the X-burst and the A-burst. Conversely, the variable position error timing component Tvxa represents a differential between a designed reading of pattern 50 by transducer 110 along the centerline of pattern 50, and an operational reading of pattern 50 by transducer 110 along the centerline of pattern 50.

For example, a fixed position error timing component Tfxa of each position error timing XA can be 10 milliseconds in view of a specific reading rate of transducer 110 whereby a determination by servo decoder 111 of each position error timing XA as 10 milliseconds indicates a variable position timing component Tvxsa of 0 milliseconds for each position error timing XA. By further example, a fixed position error timing component Tfxa of each position error timing XA again can be 10 milliseconds in view of a specific reading rate of transducer 110 whereby a determination by servo decoder 111 of each position error timing XA as 9 milliseconds indicates a variable position timing component Tvxsa of —1 milliseconds for each position error timing XA. Conversely, a fixed position error timing component Tfxa of each position error timing XA again can be 10 milliseconds in view of a specific reading rate of transducer 10 whereby a determination by servo decoder 111 of each position error timing XA as 11 milliseconds indicates a variable position error timing component Tvxsa of 1 milliseconds for each position error timing XA.

A determination of servo decoder 111 of a servo position error signal exclusive of the fixed position error timing component and inclusive of the variable position error timing component of each position error timing derived from a reading of differential timing based servo pattern 50 by transducer 110 and inclusive of the variable position error timing component of each position error timing derived from the reading of differential timing based servo pattern 50 provides various benefits including, but not limited to, an amplification of the servo position error signal that facilitates a more effective determination of the decoded servo position signal, particularly in view of an infinitesimal value of the variable position error timing component of each position error timing.

For example, in view of isolating the variable position error timing component of each position error timing signal derived from a reading of differential timing based servo patterns 50 and 53 as shown in respective FIGS. 4 and 7, a servo position error signal $SPER_9$ based on a set of position error timings corresponding servo position signals is determined by servo decoder 111 in accordance with the following equations [7], [8] and [9]:

$$SPER_7 = [\Sigma AB(i) - Iab*Tfab] - [\Sigma XA(i) - Ixa*Tfxa] \text{ (FIG. 4)} \qquad [7]$$

$$SPER_8 = [\Sigma CD(i) - Icd*Tfcd] - [\Sigma DY(i) - Idy*Tfdy] \text{ (FIG. 7)} \qquad [8]$$

$$SPER_9 = SPER_7 + SPER_8 \qquad [9]$$

where Tfxa is the fixed position error timing component of each position error timing XA (FIG. 4), Tfab is the fixed position error timing component of each position error timing AB (FIG. 4), Tfcd is the fixed position error timing component of each position error timing CD (FIG. 7), and Tfdy is the fixed position error timing component of each position error timing DY (FIG. 7). Preferably, Tfxa=Tfab and Tfcd=Tfdy.

Additionally, for $SPER_7$, I is the total number of forward-slash stripes (/////) in the A-burst of FIG. 4 and backward-slash stripes (\\\\\) in the X-burst and the B-burst of FIG. 4 whereby Ixa=Iab in $SPER_7$. Similary, for $SPER_8$, I is the total number of forward-slash stripes (/////) in the C-burst and the Y-burst of FIG. 7 and backward-slash stripes (\\\\) in the D-burst of FIG. 7 whereby Icd=Idy in $SPEC_8$.

As a result, servo position error signal $SPER_9$ will equal 0 milliseconds in response to an operational reading of patterns 50 and 53 by transducer 110 along the centerline of patterns 50 and 53 corresponding to the designed reading of patterns 50 and 53 by transducer 110 along the centerline of patterns 50 and 53 (i.e., a summation of the all of the fixed position error timing components of the position error timings is zero, and the variable position error timing component of each position error timing has a zero value). Conversely, servo position error signal $SPER_9$ will be more or less than 0 milliseconds in response to an operational reading of patterns 50 and 53 by transducer 110 along the centerline of patterns 50 and 53 differing from the designed reading of patterns 50 and 53 by transducer 110 along the centerline of patterns 50 and 53 (i.e., a summation of the all of the fixed position error timing components of the position error timings is zero, and the variable position error timing component of each position error timing has a non-zero value).

Also by example, in view of isolating the variable position error timing component of each position error timing signal derived from a reading of differential timing based servo patterns 51 and 52 as shown in respective FIGS. 5 and 6, a servo position error signal $SPER_{12}$ based on a set of position error timings corresponding servo position signals is determined by servo decoder 111 in accordance with the following equations [10], [11] and [12]:

$$SPER_{10}=[\Sigma AB(i)-Iab*Tfab]-[\Sigma BX(i)-Ibx*Tfbx] \quad (FIG. 5) \quad [10]$$

$$SPER_{11}=[\Sigma CD(i)-Icd*Tfcd]-[\Sigma YC(i)-Iyc*Tfyc] \quad (FIG. 6) \quad [11]$$

$$SPER_{12}=SPER_{10}+SPER_{11} \quad [12]$$

where Tfab is the fixed position error timing component of each position error timing AB (FIG. 5), Tfbx is the fixed position error timing component of each position error timing BX (FIG. 5), Tfyc is the fixed position error timing component of each position error timing YC (FIG. 6), and Tfcd is the fixed position error timing component of each position error timing CD (FIG. 6). Preferably, Tfab=Tfbx and Tfyc=Tfcd.

Additionally, for $SPER_{10}$, I is the total number of forward-slash stripes (/////) in the A-burst and the X-burst of FIG. 5 and backward-slash stripes (\\\\\) in the B-burst of FIG. 5 whereby Iab=Ibx in $SPER_{10}$. Similarly, for $SPER_{11}$, I is the total number of forward-slash stripes (/////) in the C-burst of FIG. 6 and backward-slash stripes (\\\\\) in Y-burst and the D-burst of FIG. 6 whereby Iyc=Icd in $SPER_{11}$.

As a result, servo position error signal $SPER_{12}$ will equal 0 milliseconds in response to an operational reading of patterns 51 and 52 by transducer 110 along the centerline of patterns 51 and 52 corresponding to the designed reading of patterns 51 and 52 by transducer 110 along the centerline of patterns 51 and 52 (i.e., a summation of the all of the fixed position error timing components of the position error timings is zero, and the variable position error timing component of each position error timing has a zero value). Conversely, servo position error signal $SPER_{12}$ will be more or less than 0 milliseconds in response to an operational reading of patterns 51 and 52 by transducer 110 along the centerline of patterns 51 and 52 differing from the designed reading of patterns 51 and 52 by transducer 110 along the centerline of patterns 51 and 52 (i.e., a summation of the all of the fixed position error timing components of the position error timings is zero, and the variable position error timing component of each position error timing has a non-zero value).

Referring to equations [9] and [12], those having ordinary skill in the art will appreciate servo position error signal $SPER_9$ of equation [9] and servo position error signal $SPER_{12}$ of equation [12] are alternative equations to obtain the same numerical result in view of respective differential timing based servo pattern patterns 50 (FIG. 4) and 53 (FIG. 7) and differential timing based servo patterns 51 (FIG. 5) and 52 (FIG. 6) having different arrangement of the same set of bursts. Furthermore, from equations [7], [8], [10] and [11], those having ordinary skill in the art will appreciate how to derive equations for a servo system alternatively incorporating differential timing based servo patterns 50 (FIG. 4) and 52 (FIG. 6), or differential timing based servo patterns 51 (FIG. 5) and 54 (FIG. 7).

Specifically, in view of isolating the variable position error timing component of each position error timing signal derived from a reading of differential timing based servo patterns 50 and 52 as shown in respective FIGS. 4 and 6, a servo position error signal $SPER_{13}$ based on a set of position error timings corresponding servo position signals is determined by servo decoder 111 in accordance with the following equations [7], [11] and [13]:

$$SPER_7=[\Sigma AB(i)-Iab*Tfab]-[\Sigma XA(i)-Ixa*Tfxa] \; (FIG. 4) \quad [7]$$

$$SPER_{11}=[\Sigma CD(i)-Icd*Tfcd]-[\Sigma YC(i)-Iyc*Tfyc] \quad (FIG. 6) \quad [11]$$

$$SPER_{13}=SPER_7+SPER_{11} \quad [13]$$

As a result, servo position error signal $SPER_{13}$ will equal 0 milliseconds in response to an operational reading of patterns 50 and 52 by transducer 110 along the centerline of patterns 50 and 52 corresponding to the designed reading of patterns 50 and 52 by transducer 110 along the centerline of patterns 50 and 52 (i.e., a summation of the all of the fixed position error timing components of the position error timings is zero, and the variable position error timing component of each position error timing has a zero value). Conversely, servo position error signal $SPER_{13}$ will be more or less than 0 milliseconds in response to an operational reading of patterns 50 and 52 by transducer 110 along the centerline of patterns 50 and 52 differing from the designed reading of patterns 50 and 52 by transducer 110 along the centerline of patterns 50 and 52 (i.e., a summation of the all of the fixed position error timing components of the position error timings is zero, and the variable position error timing component of each position error timing has a non-zero value).

Furthermore, in view of isolating the variable position error timing component of each position error timing signal derived from a reading of differential timing based servo patterns 51 and 53 as shown in respective FIGS. 5 and 7, a servo position error signal $SPER_{14}$ based on a set of position error timings corresponding servo position signals is determined by servo decoder 111 in accordance with the following equations [10], [8] and [14]:

$$SPER_{10}=[\Sigma AB(i)-Iab*Tfab]-[\Sigma BX(i)-Ibx*Tfbx] \quad (FIG. 5) \quad [10]$$

$$SPER_8=[\Sigma CD(i)-Icd*Tfcd]-[\Sigma DY(i)-Idy*Tfdy] \quad (FIG. 7) \quad [8]$$

$$SPER_{14}=SPER_{10}+SPER_8 \quad [14]$$

As a result, servo position error signal $SPER_{14}$ will equal 0 milliseconds in response to an operational reading of patterns 51 and 53 by transducer 110 along the centerline of patterns 51 and 53 corresponding to the designed reading of patterns 51 and 53 by transducer 110 along the centerline of patterns 51 and 53 (i.e., a summation of the all of the fixed position error timing components of the position error timings is zero, and the variable position error timing component of each position error timing has a zero value). Conversely, servo position error signal $SPER_{14}$ will be more or less than 0 milliseconds in response to an operational reading of patterns 51 and 53 by transducer 110 along the centerline of patterns 51 and 53 differing from the designed reading of patterns 51 and 53 by transducer 110 along the centerline of patterns 51 and 53 (i.e., a summation of the all of the fixed position error timing components of the position error timings is zero, and the variable position error timing component of each position error timing has a non-zero value).

Referring to equations [13] and [14] those having ordinary skill in the art will appreciate servo position error signal $SPER_{13}$ of equation [13] and servo position error signal $SPER_{14}$ of equation [14] are alternative equations to obtain the same numerical result in view of respective differential timing based servo pattern patterns 50 (FIG. 4) and 52 (FIG. 6) and differential timing based servo patterns 51 (FIG. 5) and 53 (FIG. 7) having different arrangement of the same set of bursts.

Those having ordinary skill in the art of servo control techniques may develop other embodiments of the present invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof it being recognized that the scope of the invention is defined and limited only by the claims which follow.

We claim:

1. A method for generating a servo pattern onto a magnetic storage media, comprising:
    generating a first burst of slash stripes in a first direction;
    generating a second burst of slash stripes in a second direction following the first burst;
    generating a third burst of slash stripes in the first direction following the second burst,
    wherein the servo pattern is generated such that a servo position error signal is calculated from the servo pattern by:
        determining a first position error timing generated from the second and third bursts and a fixed position error time component of the second and third bursts;
        determining a second position error timing from the first and second bursts and a fixed position error time component of the first and second bursts; and
        calculating a differential of the first position error timing and the second position error timing to isolate a variable position error timing component.

2. The method of claim 1, wherein the first direction of slash stripes comprises backward slash stripes and wherein the second direction of slash stripes comprises forward slash stripes.

3. The method of claim 1, wherein the first direction of slash stripes comprises forward slash stripes and wherein the second direction of slash stripes comprises backward slash stripes.

4. The method of claim 1, wherein each burst includes n slashes, and wherein determining the first position error timing is determined by calculating n second-third burst position error timings, wherein each of the n second-third burst position error timings is calculated from one slash in the second burst and one slash in the third burst at same positions in the second and third bursts, and wherein determining the second position error timing is determined by calculating n first-second burst position error timings, wherein each of the n first-second burst position error timings is calculated from one slash in the first burst and one slash in the second burst at same positions in the first and second bursts.

5. The method of claim 4, wherein determining the first position error timing farther comprises subtracting from the second-third burst position error timings a total number of slash stripes in the second and third bursts times a fixed position error time component of the second and third bursts and wherein determining the second position error timing further comprises subtracting from the first-second burst position error timings a total number of slash stripes in the first and second bursts times a fixed position error time component of the first and second bursts.

6. The method of claim 5, wherein the servo position error signal is calculated as:

$$[\Sigma AB(i) - I_{ab} * T_{fab}] - [\Sigma XA(i) - I_{xa} * T_{fxa}],$$

wherein $AB(i)$ comprises an ith second-third burst position error timing, $I_{ab}$ comprises a total number of slash stripes in the second and third bursts, and $T_{fab}$ comprises a fixed position error time component of the second and third bursts, and wherein $XA(i)$ comprises an ith first-second burst position error timing, $I_{xa}$ comprises a total number of slash stripes in the first and second bursts, and $T_{fxa}$ comprises a fixed position error time component of the first and second bursts.

7. The method of claim 1, wherein each burst includes four slashes.

8. The method of claim 1, wherein each burst includes five slashes.

9. The method of claim 1, wherein the slashes in each burst are equidistant from one another.

10. The method of claim 1, wherein the servo position error signal is exclusive of noise due to a zero differential of a first noise and a second noise.

11. The method of claim 1, wherein the variable position error timing component is non-zero if the burst patterns are read in a manner that differs from a designed reading of the patterns along a centerline of the bursts.

12. A method for generating a servo pattern, comprising:
    generating a first burst group comprising a first, second, and third bursts of slash stripes;
    generating a second burst group comprising fourth, fifth, and sixth bursts of slash stripes;
    wherein the servo pattern is generated such that a combined servo position error signal is calculated from a first servo position error signal and a second servo position error signal,
    wherein the first servo position error signal is calculated by:
        determining a first position error timing generated from the second and third bursts and a fixed position error time component of the second and third bursts;
        determining a second position error timing from the first and second bursts and a fixed position error time component of the first and second bursts; and
        calculating a differential of the first position error timing and the second position error timing to isolate a variable position error timing component;
    wherein the second servo position error signal is calculated by:
        determining a third position error timing generated from the fifth and sixth bursts and a fixed position error time component of the fifth and sixth bursts;
        determining a fourth position error timing from the fourth and sixth burst and a fixed position error time component of the fourth and sixth bursts; and
        calculating a differential of the third position error timing and the fourth position error timing to isolate a variable position error timing component.

13. The method of claim 12, wherein the first burst of slash stripes is in a first direction, wherein the second burst of slash stripes is in a second direction following the first burst, wherein the third burst of slash stripes is in the first direction following the second burst, wherein the fourth burst of slash stripes is in the second direction, wherein the fifth burst of slash stripes is in the first direction following the fourth burst, and wherein the sixth burst of slash stripes is in the second direction following the fifth burst.

14. The method of claim 13, wherein the first direction of slash stripes comprises backward slash stripes and wherein the second direction of slash stripes comprises forward slash stripes.

15. The method of claim 13, wherein the first direction of slash stripes comprises forward slash stripes and wherein the second direction of slash stripes comprises backward slash stripes.

16. The method of claim 12, wherein the first burst of slash stripes is in a first direction, wherein the second burst of slash stripes is in a second direction following the first burst, wherein the third burst of slash stripes is in the first direction following the second burst, wherein the fourth burst of slash stripes is in the first direction, wherein the fifth burst of slash stripes is in the second direction following the fourth burst, and wherein the sixth burst of slash stripes is in the first direction following the fifth burst.

17. The method of claim 12, wherein the slashes in each burst are equidistant from one another.

18. The method of claim 12, wherein the first burst group has a greater number of slashes than in the second burst group.

19. The method of claim 12,
wherein each burst in the first burst group has n slashes and wherein each burst in the second burst group has m slashes;
wherein determining the first position error timing is determined by calculating n second-third burst position error timings, wherein each of the n second-third burst position error timings is calculated from one slash in the second burst and one slash in the third burst at same positions in the second and third bursts,
wherein determining the second position error timing is determined by calculating n first-second burst position error timings, wherein each of the n first-second burst position error timings is calculated from one slash in the first burst and one slash in the second burst at same positions in the first and second bursts,
wherein determining the third position error timing is determined by calculating m fifth-sixth burst position error timings, wherein each of the m fifth-sixth burst position error timings is calculated from one slash in the fifth burst and one slash in the sixth burst at same positions in the fifth and sixth bursts,
wherein determining the fourth position error timing is determined by calculating m fourth-sixth burst position error timings, wherein each of the m fourth-sixth burst position error timings is calculated from one slash in the fourth burst and one slash in the sixth burst at same positions in the fourth and sixth bursts.

20. The method of claim 19,
wherein determining the first position error timing further comprises subtracting from the second-third burst position error timings a total number of slash stripes in the second and third bursts times a fixed position error time component of the second and third bursts,
wherein determining the second position error timing further comprises subtracting from the first-second burst position error timings a total number of slash stripes in the first and second bursts times a fixed position error time component of the first and second bursts,
wherein determining the third position error timing further comprises subtracting from the fifth-sixth burst position error timings a total number of slash stripes in the fifth and sixth bursts times a fixed position error time component of the fifth and sixth bursts,
wherein determining the fourth position error timing further comprises subtracting from the fourth-sixth burst position error timings a total number of slash stripes in the fourth and sixth bursts times a fixed position error time component of the fourth and sixth bursts.

21. The method of claim 15,
wherein the first servo position error signal is calculated as:

$$[\Sigma AB(i)-Iab*Tfab]-[\Sigma XA(i)-Ixa*Tfxa],$$

wherein AB(i) comprises an ith second-third burst position error timing, Iab comprises a total number of slash stripes in the second and third bursts, and Tfab comprises a fixed position error time component of the second and third bursts, and wherein XA (i) comprises an ith first-second burst position error timing, Ixa comprises a total number of slash stripes in the first and second bursts, and Tfxa comprises a fixed position error time component of the first and second bursts, and
wherein the second servo position error signal is calculated as:

$$[\Sigma CD(i)-Icd*Tfcd]-[\Sigma DY(i)-Idy*Tfdy],$$

wherein CD(i) comprises an ith fifth-sixth burst position error timing, Icd comprises a total number of slash stripes in the fifth and sixth bursts, and Tfab comprises a fixed position error time component of the fifth and sixth bursts, and wherein DY(i) comprises an ith fourth-sixth burst position error timing, Idy comprises a total number of slash stripes in the fourth and sixth bursts, and Tfdy comprises a fixed position error time component of the fourth and sixth bursts.

22. A servo system, comprising:
a magnetic storage media cartridge, including:
a cartridge housing adapted to interface with a cartridge drive; and
a magnetic storage media contained within the cartridge housing, the magnetic storage media including servo pattern:
a first burst of slash stripes in a first direction;
a second burst of slash stripes in a second direction following the first burst;
a third burst of slash stripes in the first direction following the second burst,
a transducer to read the servo pattern, including the first, second, and third bursts of slash stripes; and
a servo decoder to calculate a servo position error signal from the read servo pattern by:
determining a first position error timing generated from the second and third bursts and a fixed position error time component of the second and third bursts;
determining a second position error timing from the first and second bursts and a fixed position error time component of the first and second bursts; and
calculating a differential of the first position error timing and the second position error timing to isolate a variable position error timing component.

23. The servo system of claim 22, wherein each burst includes n slashes, and wherein determining the first position error timing is determined by calculating n second -third burst position error timings, wherein each of the n second-third burst position error timings is calculated from one slash in the second burst and one slash in the third burst at same positions in the second and third bursts, and wherein determining the second position error timing is determined by calculating n first-second burst position error timings, wherein each of the n first- second burst position error timings is calculated from one slash in the first burst and one slash in the second burst at same positions in the first and second bursts.

24. The servo system of claim 23, wherein determining the first position error timing further comprises subtracting from the second-third burst position error timings a total number of slash stripes in the second and third bursts times a fixed position error time component of the second and third bursts and wherein determining the second position error timing further comprises subtracting from the first-second burst position error timings a total number of slash stripes in the first and second bursts times a fixed position error time component of the first and second bursts.

25. The servo system of claim 24, wherein the servo position error signal is calculated as:

$$[\Sigma AB(i)-Iab*Tfab]-[\Sigma XA(i)-Ixa*Tfxa],$$

wherein AB(i) comprises an ith second-third burst position error timing, Iab comprises a total number of slash stripes in the second and third bursts, and Tfab comprises a fixed position error time component of the second and third bursts, and wherein XA (i) comprises an ith first-second burst position error timing, Ixa comprises a total number of slash stripes in the first and second bursts, and Tfxa comprises a fixed position error time component of the first and second bursts.

26. A magnetic storage media drive to be coupled to a magnetic storage media, comprising:
   a transducer for reading a servo pattern from the coupled magnetic storage media, including:
      a first burst of slash stripes in a first direction;
      a second burst of slash stripes in a second direction following the first burst;
      a third burst of slash stripes in the first direction following the second burst,
   a servo decoder to calculate a servo position error signal from the read servo pattern by:
      determining a first position error timing generated from the second and third bursts and a fixed position error time component of the second and third bursts;
      determining a second position error timing from the first and second bursts and a fixed position error time component of the first and second bursts; and
      calculating a differential of the first position error timing and the second position error timing to isolate a variable position error timing component.

27. The magnetic storage media drive of claim 26, wherein each burst includes n slashes, and wherein determining the first position error timing is determined by calculating n second-third burst position error timings, wherein each of the n second-third burst position error timings is calculated from one slash in the second burst and one slash in the third burst at same positions in the second and third bursts, and wherein determining the second position error timing is determined by calculating n first-second burst position error timings, wherein each of the n first-second burst position error timings is calculated from one slash in the first burst and one slash in the second burst at same positions in the first and second bursts.

28. The magnetic storage media drive of claim 27, wherein determining the first position error timing further comprises subtracting from the second-third burst position error timings a total number of slash stripes in the second and third bursts times a fixed position error time component of the second and third bursts and wherein determining the second position error timing further comprises subtracting from the first-second burst position error timings a total number of slash stripes in the first and second bursts times a fixed position error time component of the first and second bursts.

29. The magnetic storage media drive of claim 28, wherein the servo position error signal is calculated as:

$$[\Sigma AB(i) - Iab*Tfab] - [\Sigma XA(i) - Ixa*Tfxa],$$

wherein AB(i) comprises an ith second-third burst position error timing, Iab comprises a total number of slash stripes in the second and third bursts, and Tfab comprises a fixed position error time component of the second and third bursts, and wherein XA (i) comprises an ith first-second burst position error timing, Ixa comprises a total number of slash stripes in the first and second bursts, and Tfxa comprises a fixed position error time component of the first and second bursts.

* * * * *